United States Patent
Yamazaki et al.

(10) Patent No.: US 6,583,812 B1
(45) Date of Patent: Jun. 24, 2003

(54) METHOD AND APPARATUS FOR INSPECTING PHOSPHOR SCREEN OF CATHODE RAY TUBE

(75) Inventors: Tatsuya Yamazaki, Saitama-ken (JP); Toshiyuki Imaizumi, Fujioka (JP); Katsumi Omote, Fukaya (JP); Kazumasa Hirayama, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/220,697

(22) Filed: Dec. 24, 1998

(30) Foreign Application Priority Data

Dec. 26, 1997 (JP) .............................. 9-361191
Sep. 24, 1998 (JP) ........................... 10-269810

(51) Int. Cl.⁷ ................................... H04N 7/18
(52) U.S. Cl. ..................................... 348/131
(58) Field of Search .................... 382/141; 348/94, 348/131; 358/493

(56) References Cited

U.S. PATENT DOCUMENTS 4,675,729 A * 6/1987 Southgate ................ 358/106
5,039,868 A * 8/1991 Kobayashi et al. ......... 250/572
5,393,255 A * 2/1995 Hisaoka et al. ................ 445/3
5,506,676 A * 4/1996 Hendler et al. ............ 356/237
5,621,824 A * 4/1997 Ijiri et al. .................... 382/274

FOREIGN PATENT DOCUMENTS

JP 7-85794 3/1995

\* cited by examiner

Primary Examiner—Chris Kelley
Assistant Examiner—George A Bugg, Jr.
(74) Attorney, Agent, or Firm—Pillsbury Winthrop LLP

(57) ABSTRACT

A cathode ray tube phosphor screen inspecting method includes the steps of illuminating a panel of a cathode ray tube, in which a phosphor screen having a regular pattern is formed the inner surface of a face, from the inner surface of the face, imaging the face inner surface, and specifying a defect on the phosphor screen from data obtained by the imaging. The panel, an illuminating unit for illumination, and an image unit for performing the imaging are moved relative to each other. The amount of light from the illuminating unit is changed in accordance with this relative movement.

19 Claims, 12 Drawing Sheets

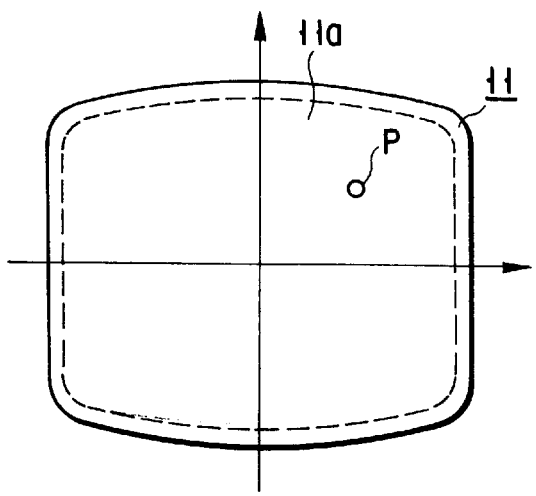
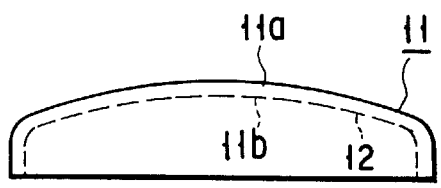
FIG.1A
FIG.1B
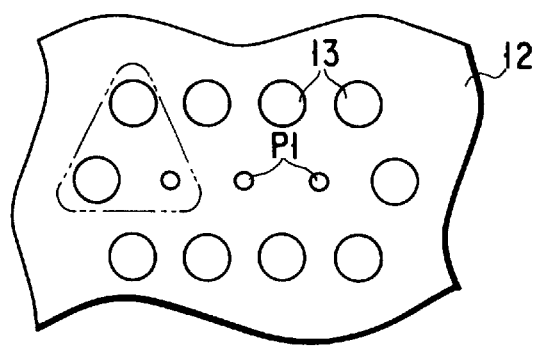
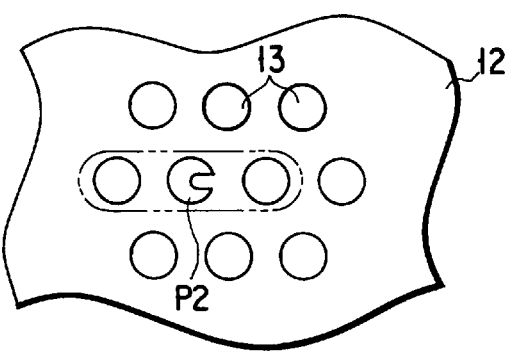
FIG.2A
FIG.2B
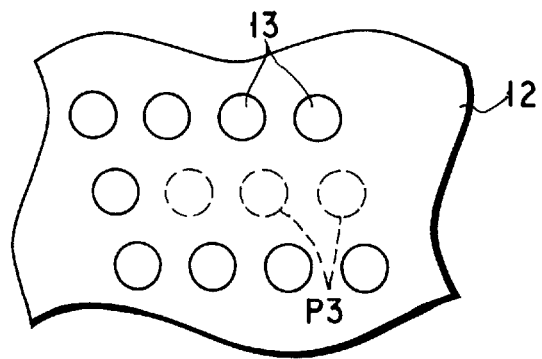
FIG.2C

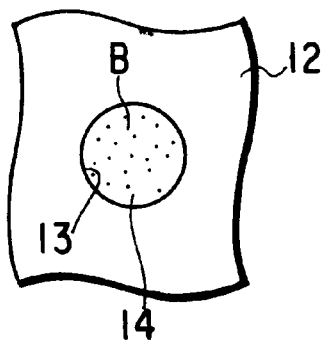
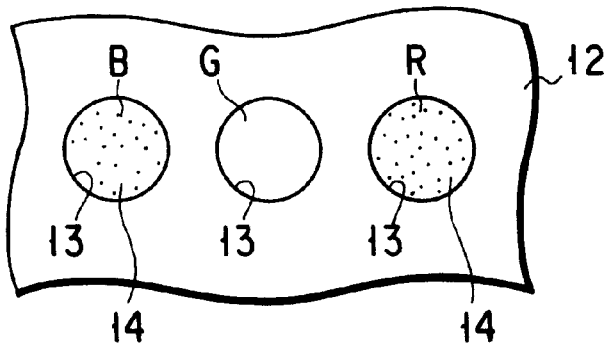
FIG.3A        FIG.3B
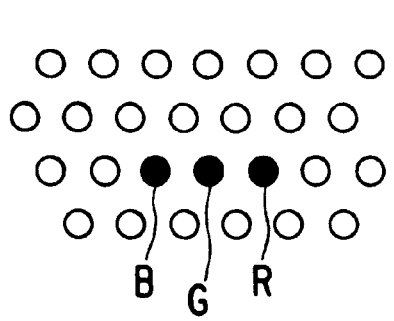
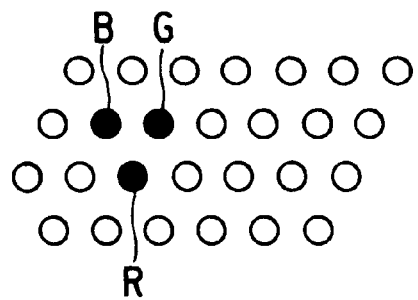
FIG.4A        FIG.4B
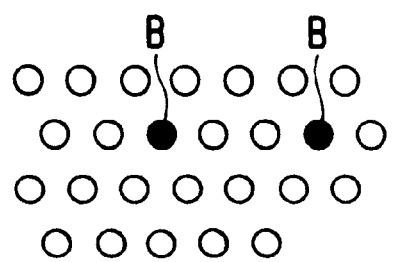
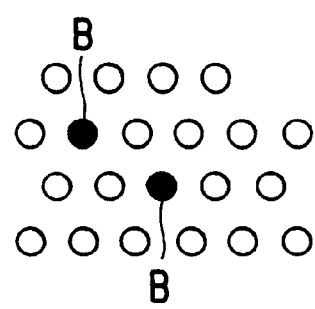
FIG.5A        FIG.5B

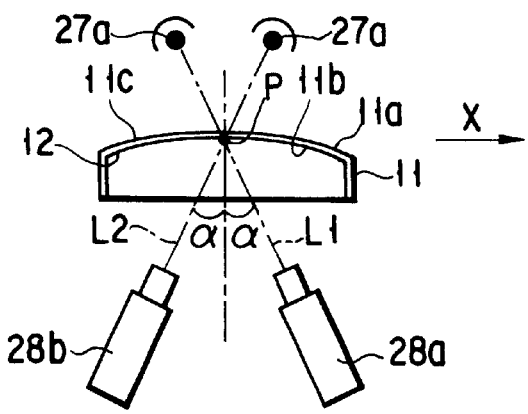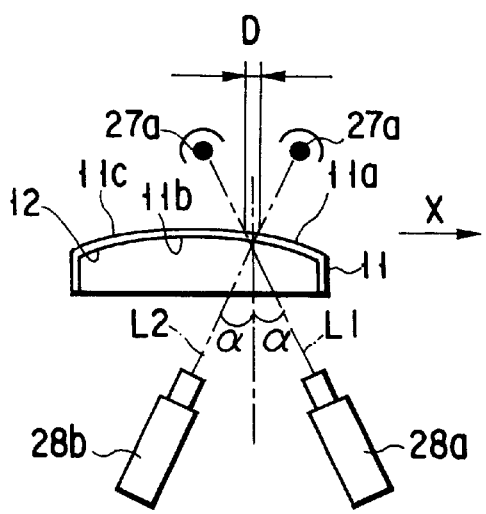
FIG.26A  FIG.26B
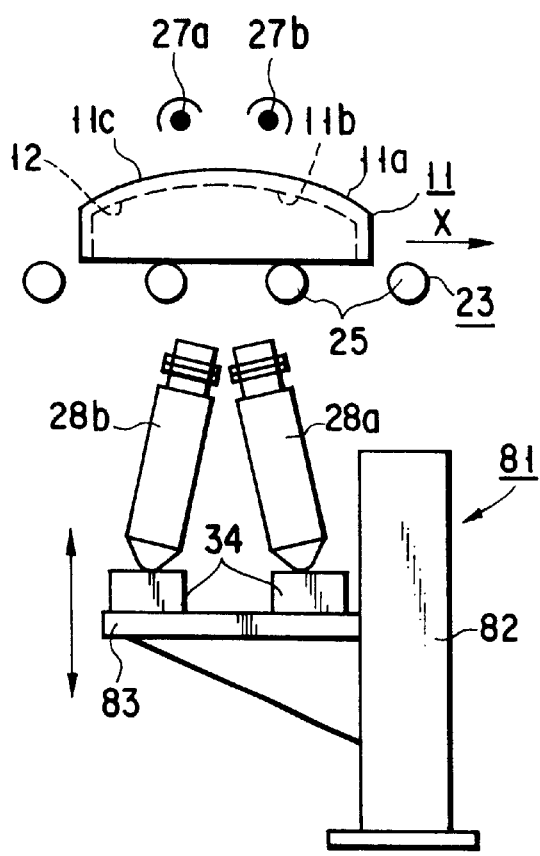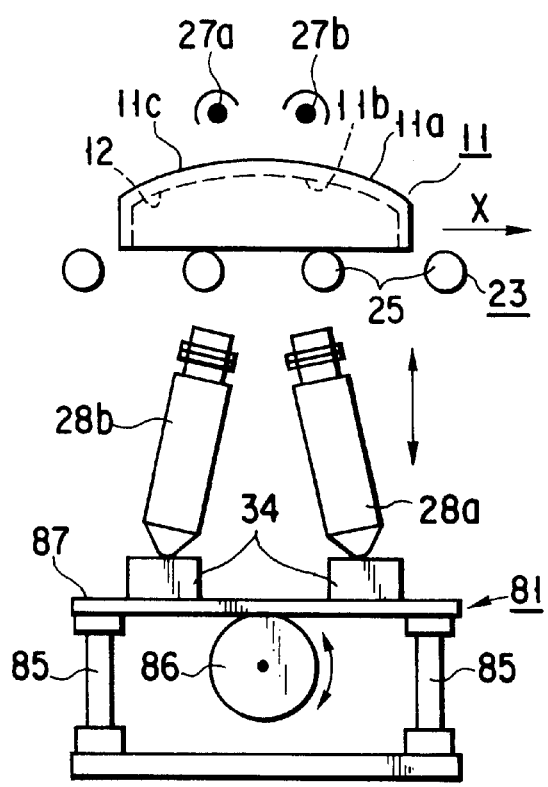
FIG.27  FIG.28

METHOD AND APPARATUS FOR INSPECTING PHOSPHOR SCREEN OF CATHODE RAY TUBE

BACKGROUND OF THE INVENTION

The present invention relates to a cathode ray tube phosphor screen inspecting method and apparatus for inspecting defects on a phosphor screen formed on the face inner surface of a panel of a cathode ray tube in the steps of manufacturing the cathode ray tube.

Conventionally, as shown in FIGS. 1A and 1B, a black film 12 having a predetermined pattern is formed on a face inner surface 11b of a curved glass face 11a forming a panel 11 of a cathode ray tube such as a display tube. As shown in FIGS. 2A to 2C, in the pattern of this black film 12 a large number of holes 13 having a predetermined shape such as a circular shape are regularly formed. In the steps of manufacturing a cathode ray tube, this pattern is formed on the face inner surface 11b through a resist coating step, an exposure step using a shadow mask, a development step using no shadow mask, and a dag coating step.

In this black film pattern formation process, as shown in FIGS. 2A to 2C, small-diameter holes P1, a deformed hole P2, no-aperture portions P3, and large-diameter holes (not shown) sometimes form as defects in the black film 12. That is, the small-diameter holes P1 shown in FIG. 2A are smaller than other holes 13 having a predetermined shape. The deformed hole P2 shown in FIG. 2B is different in shape from the circular holes 13. In the no-aperture portions P3 shown in FIG. 2C, no holes 13 are formed in portions where the apertures 13 are to be formed. The large-diameter holes are larger than other holes 13 having a predetermined shape.

Many of these small-diameter holes P1, deformed hole P2, and no-aperture portions P3 form in the exposure step. That is, exposure is performed via a shadow mask in the exposure step. Therefore, if the diameters of some holes in the shadow mask are smaller than the diameter of other normal holes, small-diameter holes P1 form as shown in FIG. 2A. Also, a fine dust particle sticking to the film surface forms a deformed hole P2 in which a part of an aperture hole 13 is missing, as shown in FIG. 2B. Furthermore, if the shadow mask is locally devoid of holes, no-aperture portions P3 form as shown in FIG. 2C. Since one of three dots of blue, green, and red phosphors is formed in each hole of the shadow mask, a defect involves a set of three holes as indicated by the alternate long and two dashed lines in FIGS. 2A and 2B.

After a defect-free black film 12 is formed, the film 12 is sequentially coated with blue, green, and red phosphors to form phosphor films, thereby finally forming a phosphor screen. The phosphor films are formed as follows. First, a phosphor is charged into the panel inner surface, and a phosphor film of the first color is formed through spin coating, drying, an exposure step using a shadow mask, and a development step using no shadow mask. After that, phosphor films of the second and third colors are formed through the same process.

In this phosphor film formation process, as shown in FIGS. 3A and 3B, phosphor films 14 of blue B, green G, and red R are sometimes not well formed to produce defects. A representative defect is called dot missing e.g. phosphor peeling. In FIG. 3A, a part of the phosphor film 14 of blue B is missing in the aperture 13 in the black film 12. In FIG. 3B, the phosphor film 14 of green G is entirely missing in the aperture 13 in the black film 12. In either case, phosphors failed to adhere in a desired pattern. Furthermore, in the phosphor film coating process, where dust adheres to the inner surface of the panel, the portions of which the phosphors are to be formed, are occupied with the dust. These portions are defect called dust.

Although either dot missing: described above is a defect, whether dot missing is non-defective (non-defective product) or defective (defective product) is in many instances determined in accordance with the position or pattern (defect pattern) on the phosphor screen. For example, it is very difficult to form a defect-free phosphor film in a display tube for use in a monitor display; some defects are practically no problem depending on the position or pattern on the phosphor screen.

Patterns of dot missing as a defect and a method of determining whether dot missing is non-defective or defective in accordance with the pattern will be described below with reference to FIGS. 4A to 7B.

FIGS. 4A and 4B show missing of a set of three dots of blue B, green G, and red R forming one pixel. In FIG. 4A, three dots of blue B, green G, and red R horizontally arranged in a line are missing. In FIG. 4B, three dots of blue B, green G, and red R adjacent to each other in the form of a triangle are missing. In either case, it is determined that the dot missing is non-defective if only one set of dots are missing and defective if two or more sets of dots are missing.

FIGS. 5A and 5B show missing of two adjacent dots of the same color. In FIG. 5A, two dots of blue B horizontally adjacent to each other are missing. In FIG. 5B, two dots of blue B adjacent to each other in different rows are missing. In either case, it is determined that the dot missing is defective.

FIGS. 6A and 6B show missing of two adjacent dots of two different colors. In FIG. 6A, two adjacent dots of blue B and green G are missing, and it is, for example, determined that this dot missing is defective. In FIG. 6B, two dots of blue B and green G at a distance d1 are missing. It is determined that this dot missing is non-defective if, for example, the distance d1 is 50 mm or more and defective if the distance d1 is 50 mm or less. Also, even when two dots of the same color are missing, it is determined that this dot missing is non-defective if the distance d1 is 50 mm or more.

FIGS. 7A and 7B show missing of one set of dots and another dot at a distance d2. It is determined that this dot missing is non-defective if, for example, the distance d2 is 50 mm or more and defective if the distance d2 is 50 mm or less.

FIG. 8 shows a method of determining whether dot missing is non-defective or defective in accordance with the position of the dot missing on an effective surface (phosphor screen) of the panel 11. Assume, for example, that a central circle on the effective surface of the panel 11 is a region A1 and its outside portion is a region A2. If this is the case, the region A1 is required to be defect-free, and the above defect standards are applied to the region A2.

These non-defective·defective determination standards are sometimes changed in accordance with the type and size of display tube.

The quality of a phosphor screen on which a black film 12 and phosphor films 14 are thus formed is usually inspected at the exit of a black film coating machine or a phosphor screen coating machine. This inspection is manually performed by placing the panel 11 on a panel conveyor or unloading the panel 11 from the panel conveyor and placing the panel 11 on a light table.

In this inspection of the phosphor screen on which the black film 13 and the phosphor films 14 are formed, e.g., in inspection of the phosphor screen of a common display tube, however, searching for defects is time-consuming and difficult because the diameter of the apertures 13 in the black film 12 is 90 to 150 μm and the aperture pitch of the apertures 13 for, e.g., green and green phosphors is 200 to 280 μm, a very small value. Hence, inspecting display tubes that are becoming increasingly finer is a heavy burden on inspectors, so some improvements are being demanded.

BRIEF SUMMARY OF THE INVENTION

It is an object of the present invention to provide a cathode ray tube phosphor screen inspecting method capable of automatically and accurately inspecting defects on the phosphor screen of a cathode ray tube.

It is another object of the present invention to provide a cathode ray tube phosphor screen inspecting apparatus capable of automatically and accurately inspecting defects on the phosphor screen of a cathode ray tube.

According to the present invention, there is provided a cathode ray tube phosphor screen inspecting method comprising the steps of illuminating a panel of a cathode ray tube, in which a phosphor screen having a regular pattern is formed on an inner surface of a face, from the inner surface of the face, imaging the face inner surface, and specifying a defect on the phosphor screen from data obtained by the imaging.

According to the present invention, there is provided a cathode ray tube phosphor screen inspecting method comprising the steps of illuminating a panel of a cathode ray tube, in which a phosphor screen having a regular pattern is formed on an inner surface of a face, from the inner surface or an outer surface of the face, imaging light components transmitted through the same position on the phosphor screen of the panel in a plurality of directions at the same time, moving imaging positions relative to the phosphor screen of the panel, and specifying a potential defective portion detected by the simultaneous imaging in a plurality of directions as a defect on the phosphor screen.

According to the present invention, there is provided a cathode ray tube phosphor screen inspecting method comprising the steps of illuminating a panel of a cathode ray tube, in which a phosphor screen having a regular pattern is formed on an inner surface of a face, from an outer surface of the face, imaging light transmitted through the panel, specifying a defect on the phosphor screen from data obtained by the imaging, and collating the specified defect on the phosphor screen with non-defective-defective determination conditions defining non-defective-defective of a position and pattern on a phosphor screen, thereby determining whether the phosphor screen is non-defective or defective.

According to the present invention, there is provided a cathode ray tube phosphor screen inspecting apparatus comprising illuminating means for illuminating a panel of a cathode ray tube, in which a phosphor screen having a regular pattern is formed on an inner surface of a face, from the inner surface of the face, imaging means for imaging the face inner surface, and defect detecting means for specifying a defect on the phosphor screen from imaging data obtained by the imaging means.

According to the present invention, there is provided a cathode ray tube phosphor screen inspecting apparatus comprising illuminating means for illuminating a panel of a cathode ray tube, in which a phosphor screen having a regular pattern is formed on an inner surface of a face, from the inner surface or an outer surface of the face, a plurality of imaging means for imaging light components transmitted through the same position on the phosphor screen of the panel in a plurality of directions at the same time, moving means for moving imaging positions relative to the phosphor screen of the panel, and defect detecting means for specifying a potential defective portion detected by the simultaneous imaging in a plurality of directions as a defect on the phosphor screen.

According to the present invention, there is provided a cathode ray tube phosphor screen inspecting apparatus comprising illuminating means for illuminating a panel of a cathode ray tube, in which a phosphor screen having a regular pattern is formed on an inner surface of a face, from an outer surface of the face, imaging means for imaging light transmitted through the panel, defect detecting means for specifying a defect on the phosphor screen from imaging data obtained by the imaging means, storage means for storing non-defective-defective determination conditions defining non-defective-defective of a position and pattern of a defect on a phosphor screen, and non-defective-defective determining means for collating the defect specified on the phosphor screen by the defect detecting means with the non-defective-defective determination conditions stored in the storage means, thereby determining whether the phosphor screen is non-defective or defective.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are plan and side views, respectively, of the panel of a cathode ray tube;

FIGS. 2A to 2C are views showing defects in a black film formed on the inner surface of the panel of the cathode ray tube;

FIGS. 3A and 3B are views showing examples of dot missing as a defect in a phosphor screen formed on the panel inner surface of the cathode ray tube;

FIGS. 4A and 4B are views showing defects in the phosphor screen formed on the panel inner surface of the cathode ray tube;

FIGS. 5A and 5B are views showing defects in the phosphor screen formed on the panel inner surface of the cathode ray tube;

FIGS. 26A and 26B are views for explaining the relationship between a panel in motion, illuminating means, and imaging means;

FIG. 27 is a side view showing a cathode ray tube phosphor screen inspecting apparatus according to the seventh embodiment of the present invention; and FIG. 28 is a side view showing a cathode ray tube phosphor screen inspecting apparatus according to the eighth embodiment of the present invention.

DETAILED DESCRIPTION OF THE INVENTION

Figure 6A:
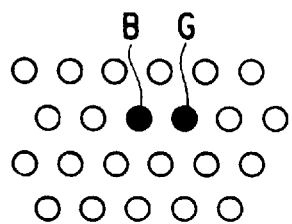
FIGS. 6A and 6B are views showing defects in the phosphor screen formed on the panel inner surface of the cathode ray tube.

A cathode ray tube phosphor screen inspecting method according to the first aspect of the present invention is characterized by comprising the steps of illuminating a panel of a cathode ray tube, in which a phosphor screen having a regular pattern is formed on an inner surface of a face, from the inner surface of the face, imaging the face inner surface, and specifying a defect on the phosphor screen from data obtained by the imaging.

In this inspection method, the phosphor screen on the face inner surface of the panel is illuminated, and the reflected light from the phosphor screen is imaged. A defect on the phosphor screen is pinpointed from this imaging data. Accordingly, inspection for defects on the phosphor screen can be automatically performed with high accuracy. Additionally, inspection is performed by imaging the reflected light from the face inner surface on which the phosphor screen is formed. Therefore, foreign matter such as dust or dag sticking to the face outer surface has no influence on inspection, so the inspection accuracy improves.

Also, the panel, illuminating means for illumination, and imaging means for imaging are moved relative to each other, and the light amount of the illuminating means is changed in accordance with this relative movement. Hence, inspection can be automatically done while the panel, illuminating means, and imaging means are moved relative to each other. Additionally, the light amount of the illuminating means is changed in accordance with the relative movement, so the amount of reflected light entering the imaging means is prevented from overflowing even if the incident amount greatly changes in accordance with the shape of the face inner surface. This improves the inspection accuracy.

Furthermore, a plurality of illuminating means are juxtaposed in the direction of movement relative to the panel, and the light amount of each illuminating means is so changed that the total amount of light irradiated from these illuminating means onto the face inner surface remains unchanged. Accordingly, the face inner surface can be evenly illuminated, so the inspection accuracy improves.

Additionally, the panel, illuminating means for illumination, and a plurality of imaging means for imaging are moved relative to each other in the direction in which these imaging means line up, and imaging operations of the imaging means are switched in accordance with this relative movement. Hence, when the amount of reflected light entering the imaging means largely changes in accordance with the shape of the face inner surface and the amount of reflected light entering a certain imaging means overflows, inspection can be performed by another imaging means. This improves the inspection accuracy.

A cathode ray tube phosphor screen inspecting method according to the second aspect of the present invention is characterized by comprising the steps of illuminating a panel of a cathode ray tube, in which a phosphor screen having a regular pattern is formed on an inner surface of a face, from the inner surface or an outer surface of the face, imaging light components transmitted through the same position on the phosphor screen of the panel in a plurality of directions at the same time, moving imaging positions relative to the phosphor screen of the panel, and specifying a potential defective portion detected by the simultaneous imaging in a plurality of directions as a defect on the phosphor screen.

In this inspection method, the panel is illuminated from one of the face inner surface and the face outer surface, and light components transmitted through the same position on the phosphor screen of the panel are simultaneously imaged in a plurality of directions. Consequently, a defect on the phosphor screen is imaged in a plurality of directions at the same time and hence can be specified as a defect on the phosphor screen. Whether foreign matter sticking to the face outer surface is detected or not detected depends upon the imaging direction. Even when foreign matter is detected in a plurality of imaging directions, it is detected with certain time differences. That is, no foreign matter is detected in a plurality of imaging directions at the same time. This allows this foreign matter to be specified as foreign matter, not as a defect on the phosphor screen.

Also, since illumination is performed in a plurality of directions opposite to a plurality of imaging directions, defects and foreign matter can be reliably imaged, so the imaging accuracy improves.

Additionally, a plurality of imaging directions are two directions along the direction in which the imaging position is moved relative to the phosphor screen of the panel, and symmetrically inclined 5 to 15° to an axis perpendicular to the phosphor screen of the panel. Hence, defects on the phosphor screen and foreign matter on the face outer surface can be reliably distinguished.

Furthermore, the method further comprises the step of collating a specified defect on the phosphor screen with non-defective·defective determination conditions defining non-defective·defective of a position and pattern on a phosphor screen, thereby determining whether the phosphor screen is non-defective or defective. Accordingly, fine and accurate inspection can be automatically performed in accordance with the type and size of cathode ray tube.

A cathode ray tube phosphor screen inspecting method according to the third aspect of the present invention is characterized by comprising the steps of illuminating a panel of a cathode ray tube, in which a phosphor screen having a regular pattern is formed on an inner surface of a face, from an outer surface of the face, imaging light transmitted through the panel, specifying a defect on the phosphor screen from data obtained by the imaging, and collating the specified defect on the phosphor screen with non-defective·defective determination conditions defining non-defective·defective of a position and pattern on a phosphor screen, thereby determining whether the phosphor screen is non-defective or defective.

In this inspection method, the panel is illuminated from the face outer surface, and the light transmitted through the panel is imaged. A defect on the phosphor screen is located from the imaging data and collated with non-defective·defective determination conditions defining non-defective·defective of a position and pattern on a phosphor screen, thereby determining whether the phosphor screen is non-defective or defective. Therefore, fine and accurate inspection can be automatically performed in accordance with the type and size of cathode ray tube.

Also, since the imaging distance to the face inner surface is kept constant, inspection can be accurately performed in accordance with the panel shape, and phosphor screens can be automatically inspected on a multi-product production line.

A cathode ray tube phosphor screen inspecting apparatus according to the fourth aspect of the present invention is characterized by comprising illuminating means for illuminating a panel of a cathode ray tube, in which a phosphor screen having a regular pattern is formed on an inner surface of a face, from the inner surface of the face, imaging means for imaging the face inner surface, and defect detecting means for specifying a defect on the phosphor screen from imaging data obtained by the imaging means.

In this inspection apparatus, the phosphor screen on the face inner surface of the panel is illuminated, and the reflected light from the phosphor screen is imaged. A defect on the phosphor screen is specified from this imaging data. Consequently, a black film and phosphor films on the phosphor screen can be automatically inspected with high accuracy. Additionally, inspection is performed by imaging the reflected light from the face inner surface on which the phosphor screen is formed. Therefore, dust particles or foreign matter sticking to the face outer surface has no influence on inspection, so the inspection accuracy improves.

Also, the apparatus further comprises moving means for moving the panel, illuminating means, and imaging means relative to each other, and illumination control means for changing the light amount of the illuminating means in accordance with this relative movement. Consequently, inspection can be automatically performed while the panel, illuminating means, and imaging means are moved relative to each other. Additionally, the light amount of the illuminating means is changed in accordance with the relative movement, so the amount of reflected light entering the imaging means is prevented from overflowing even if the incident amount greatly changes in accordance with the shape of the face inner surface. This improves the inspection accuracy.

Furthermore, a plurality of illuminating means are juxtaposed in the direction of movement relative to the panel, and the light amount of each illuminating means is so changed that the total amount of light irradiated from these illuminating means onto the face inner surface remains unchanged. Accordingly, the face inner surface can be evenly illuminated, so the inspection accuracy improves.

Additionally, a plurality of imaging means are juxtaposed in at least the direction of movement relative to the panel, and the apparatus further comprises moving means for moving the panel, illuminating means, and imaging means relative to each other, and imaging control means for switching imaging operations of the imaging means in accordance with this relative movement. Therefore, when the amount of reflected light entering the imaging means considerably changes in accordance with the shape of the face inner surface and the amount of reflected light entering a certain imaging means overflows, inspection can be performed by another imaging means. This improves the inspection accuracy.

A cathode ray tube phosphor screen inspecting apparatus according to the fifth embodiment of the present invention is characterized by comprising illuminating means for illuminating a panel of a cathode ray tube, in which a phosphor screen having a regular pattern is formed on an inner surface of a face, from the inner surface or an outer surface of the face, a plurality of imaging means for imaging light components transmitted through the same position on the phosphor screen of the panel in a plurality of directions at the same time, moving means for moving imaging positions relative to the phosphor screen of the panel, and defect detecting means for specifying a potential defective portion detected by the simultaneous imaging in a plurality of directions as a defect on the phosphor screen.

In this inspection apparatus, the panel is illuminated from one of the face inner surface and the face outer surface, and light components transmitted through the same position of the phosphor screen of the panel are simultaneously imaged in a plurality of directions. Consequently, a defect on the phosphor screen is imaged in a plurality of directions at the same time and hence can be specified as a defect on the phosphor screen. Whether foreign matter sticking to the face outer surface is detected or not detected depends upon the imaging direction. Even when foreign matter is detected in a plurality of imaging directions, it is detected with certain time differences. That is, no foreign matter is detected in a plurality of imaging directions at the same time. This allows this foreign matter to be specified as foreign matter, not as a defect on the phosphor screen.

Also, since the illuminating means illuminates in a plurality of directions opposite to a plurality of imaging directions, defects and foreign matter can be reliably imaged, so the inspection accuracy improves.

Additionally, a pair of imaging means are juxtaposed along the direction in which the imaging position is moved relative to the phosphor screen of the panel by the moving means, and symmetrically inclined 5 to 15° to an axis perpendicular to the phosphor screen of the panel. Hence, defects on the phosphor screen and foreign matter on the face outer surface can be reliably distinguished.

Furthermore, the apparatus further comprises storage means for storing non-defective·defective determination conditions defining non-defective·defective of a position and pattern of a defect on a phosphor screen, and non-defective·defective determining means for collating the defect specified on the phosphor screen by the defect detecting means with the non-defective·defective determination conditions stored in the storage means, thereby determining whether the phosphor screen is non-defective or defective. Accordingly, fine and accurate inspection can be automatically performed in accordance with the type and size of cathode ray tube.

A cathode ray tube phosphor screen inspecting apparatus according to the sixth aspect of the present invention is characterized by comprising illuminating means for illuminating a panel of a cathode ray tube, in which a phosphor screen having a regular pattern is formed on an inner surface of a face, from an outer surface of the face, imaging means for imaging light transmitted through the panel, defect detecting means for specifying a defect on the phosphor screen from imaging data obtained by the imaging means, storage means for storing non-defective·defective determination conditions defining non-defective·defective of a position and pattern of a defect on a phosphor screen, and non-defective·defective determining means for collating the defect specified on the phosphor screen by the defect detecting means with the non-defective·defective determination conditions stored in the storage means, thereby determining whether the phosphor screen is non-defective or defective.

In this inspection apparatus, the panel is illuminated from the face outer surface, and the light transmitted through the panel is imaged. A defect on the phosphor screen is specified from the imaging data and collated with non-defective·defective determination conditions defining non-defective·defective of the position and pattern on a phosphor screen, thereby determining whether the phosphor screen is non-defective or defective. Therefore, fine and accurate inspection can be automatically performed in accordance with the type and size of cathode ray tube.

Also, the apparatus further comprises distance adjusting means for keeping the distance between the face inner surface and the imaging means constant. Therefore, inspection can be accurately performed in accordance with the panel shape, and phosphor screens can be automatically inspected on a multi-product production line.

Cathode ray tube phosphor screen inspecting methods and apparatuses according to various embodiments of the present invention will be described below with reference to the accompanying drawings.

A panel 11 of a cathode ray tube to be inspected has the same arrangement as shown in FIGS. 1A and 1B. For example, this panel 11 is a panel of a color cathode ray tube. A black film 12 having a pattern in which a large number of holes 13 with a predetermined shape are regularly formed is formed on a curved face inner surface 11b of a glass face 11a of the panel 11.

The first embodiment will be described below with reference to FIGS. 9 to 15B.

Figure 9:
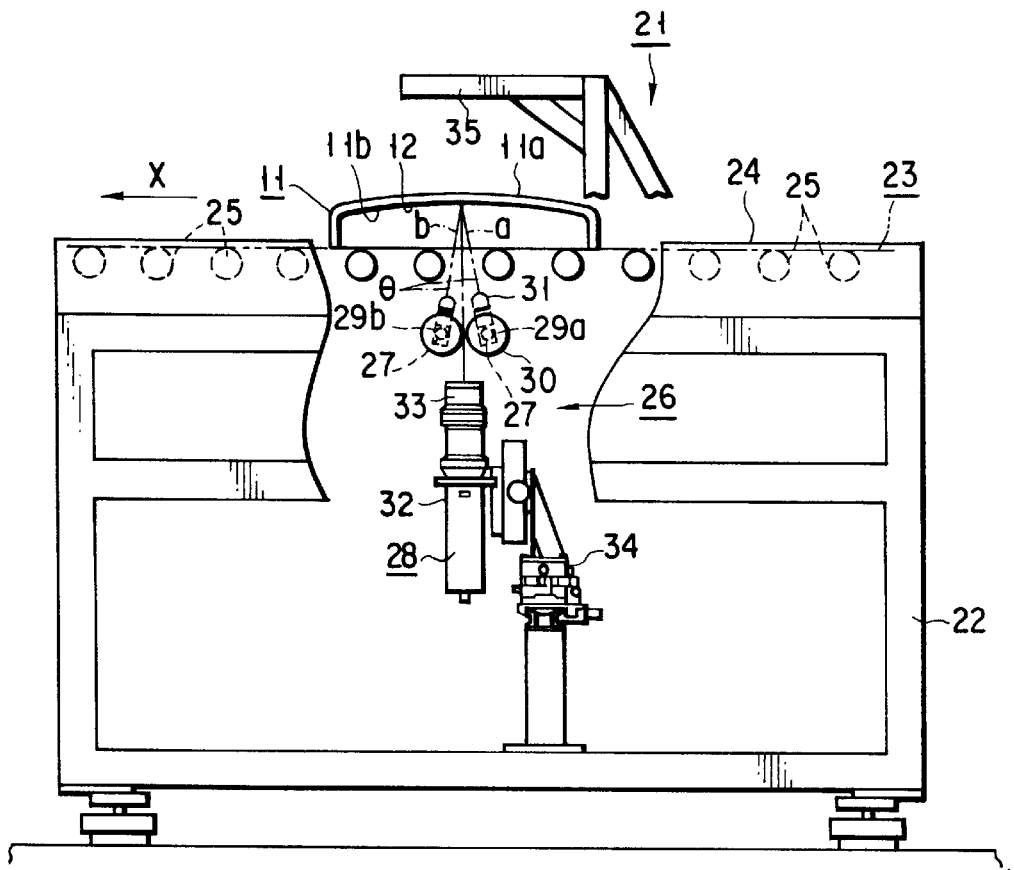
FIG. 9 is a partially cutaway side view showing a cathode ray tube phosphor screen inspecting apparatus according to the first embodiment of the present invention.
Figure 10:
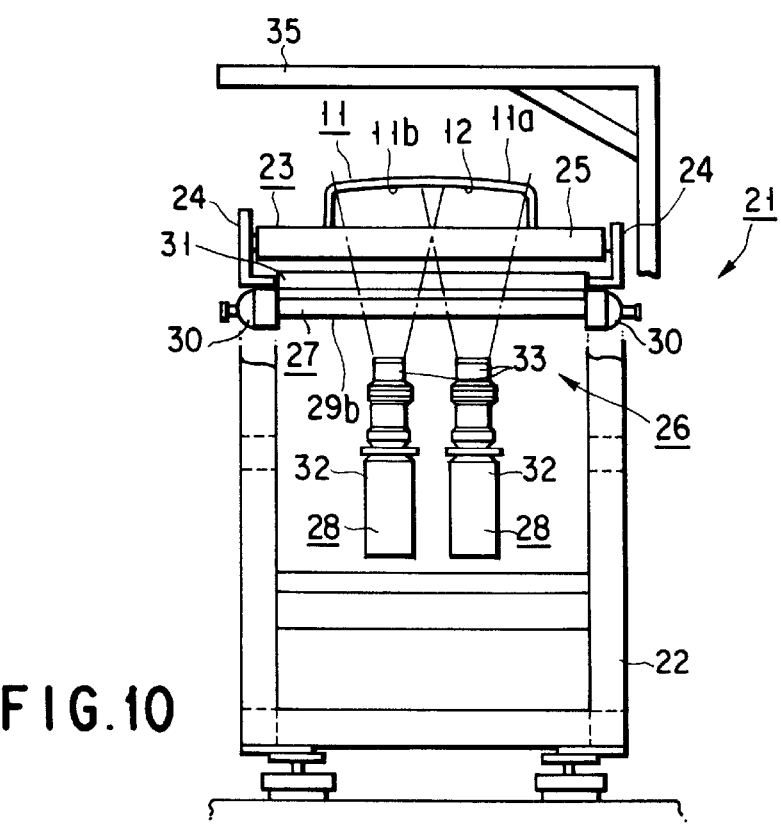
FIG. 10 is a front view of the phosphor screen inspecting apparatus shown in FIG. 9.

FIG. 9 is a partially cutaway side view of a cathode ray tube phosphor screen inspecting apparatus. FIG. 10 is a front view of this phosphor screen inspecting apparatus.

In FIGS. 9 and 10, reference numeral 21 denotes the phosphor screen inspecting apparatus. A conveyor 23 as moving means for moving a panel 11 is disposed on the upper surface of a frame 22 of this phosphor screen inspecting apparatus 21. This conveyor 23 is a roller conveyor in which a plurality of rollers 25 extend parallel to each other between two conveyor frames 24 and rotate.

The panel 11 is placed on the conveyor 23 with a face 11a facing up (a face inner surface 11b facing down). The panel 11 is conveyed in a conveyance direction X indicated by an arrow in FIG. 9 by the rotation of the rollers 25.

A detecting unit 26 is disposed below the conveyor 23 so as to oppose a portion between two adjacent rollers 25. This detecting unit 26 includes a pair of illuminating means 27 adjacent to each other or juxtaposed in the conveyance direction X, and imaging means (detecting means) 28 disposed underneath a portion between these illuminating means 27.

The illuminating means 27 have linear light sources 29a and 29b such as long halogen lamps. The two ends of each of these light sources 29a and 29b are connected to a pair of sockets 30. These sockets 30 are located beneath the conveyor frames 24 and support the light sources 29a and 29b such that the axes of the light sources 29a and 29b are perpendicular to the conveyance direction of the panel 11.

Cylindrical lenses 31 are placed above the light sources 29a and 29b. These cylindrical lenses 31 converge light from the light sources 29a and 29b to obtain an even irradiation distribution on the face inner surface 11b and thereby increase the amount of light received by the imaging means. The cylindrical lenses 31 are used because the light amount received by the imaging means significantly lowers in a reflection system compared to that in a transmission illumination system. The illuminating means 27 are symmetrically arranged so that principal rays a and b of the illuminating light incline an angle θ inward to the vertical axis (the detection line central axis of the imaging means 28).

The imaging means 28 includes a plurality of (two) cameras (CCD cameras) 32 each having a line sensor with a plurality of bits (e.g., 5,000 bits). These cameras 32 line up or are juxtaposed in a direction perpendicular to the conveyance direction X so that the direction of alignment of the line sensor pixels is perpendicular to the conveyance direction X and lenses 33 face up. These cameras are arranged so that they image the inner surface of the panel on the direction perpendicular to the conveyance direction in an overlapped manner. A camera adjusting mechanism 34 vertically extending from the frame 22 adjusts the positions of the CCD cameras 32.

A light-shielding cover 35 for covering a portion above the detecting unit 26 to shield the light irradiated from the illuminating means 27 is disposed above the conveyor 23.

Figure 11:
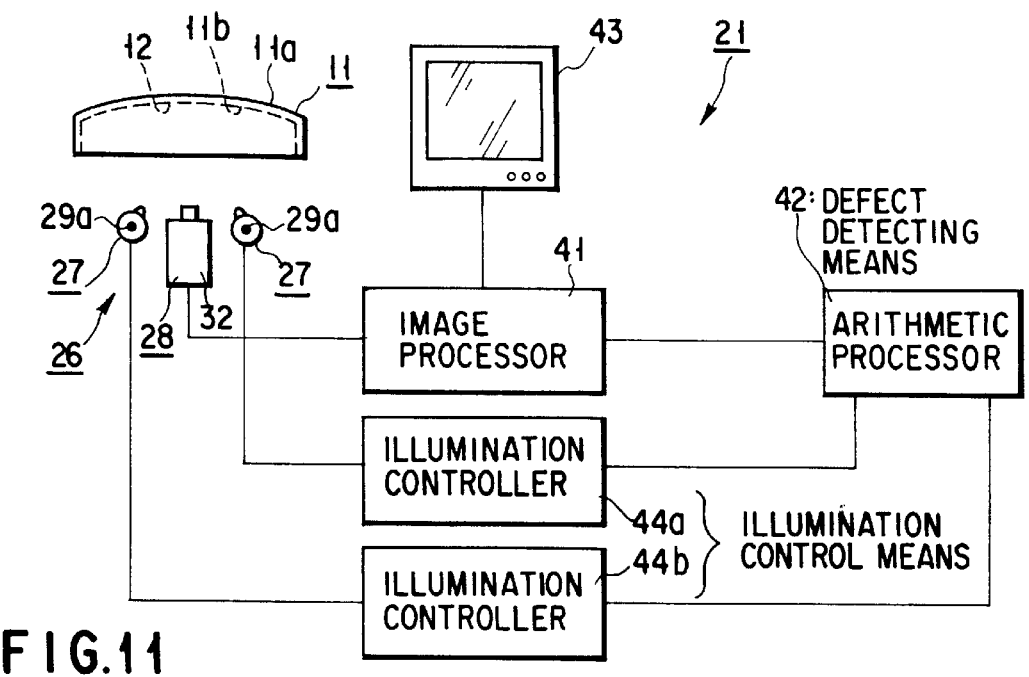
FIG. 11 is a block diagram showing the arrangement of the cathode ray type phosphor screen inspecting apparatus according to the first embodiment of the present invention.

FIG. 11 is a block diagram showing the arrangement of the phosphor screen inspecting apparatus 21.

Referring to FIG. 11, the cameras 32 of the imaging means 28 are connected to an arithmetic processor 42 as defect detecting means via an image processor 41. An output from the image processor 42 is displayed on a monitor display 43. The image processor 41 processes images obtained by the cameras 32, and the arithmetic processor 42 specifies a defect P (a small-diameter hole P1, a deformed hole P2, a no-aperture portion P3, or a large-diameter hole).

The light sources 29a and 29b of the illuminating means 27 are connected to the arithmetic processor 42 via illumination controllers 44a and 44b as illumination control means.

A phosphor screen inspecting method using the above phosphor screen inspecting apparatus 21 will be described below.

First, an outline of this phosphor screen inspecting method will be described.

As shown in FIGS. 9 and 10, the panel 11 is conveyed by the conveyor 23 at a fixed speed, and the illuminating means 27 illuminate the face inner surface 11b of the panel 11. The cameras 32 of the imaging means 28 image (detect) the reflected light. While the panel 11 passes over the imaging means 28, the entire face inner surface 11b of the panel 11 is scanned.

Figure 15A:
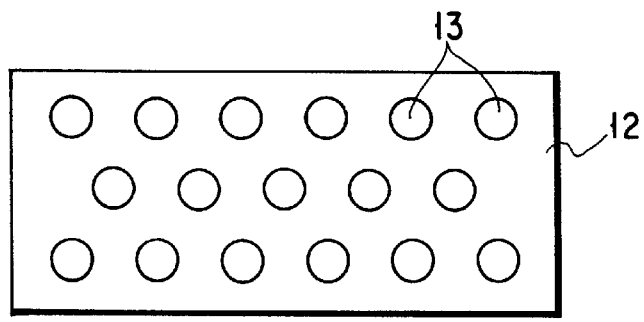
FIGS. 15A and 15B are views for explaining an image obtained by the reflection method and an image obtained by the transmission method, respectively.
Figure 15B:
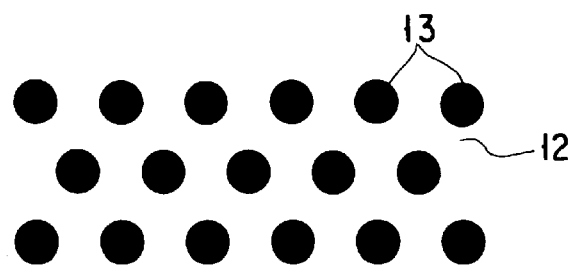

As shown in FIG. 15B, only the apertures 13 are black in the detected image because the reflected light from the black film 12 is detected. The image processor 41 processes this image, and the arithmetic processor 42 specifies a defect P.

As described above, while the panel 11 is conveyed, the phosphor screen on the face inner surface 11b of the panel 11 is illuminated, and the reflected light from the phosphor screen is imaged. Since a defect on the phosphor screen is specified from this imaging data, the defect P on the black film 12 or phosphor films on the phosphor screen can be automatically inspected with high accuracy. Additionally, inspection is performed by imaging the reflected light from the face inner surface 11b on which the phosphor screen is formed. Therefore, foreign matter such as dust or dag sticking to the face outer surface has no influence on inspection, so the inspection accuracy improves.

Furthermore, light is irradiated through the cylindrical lenses 31 disposed above the light sources 29a and 29b of the illuminating means 27, so the face inner surface 11b of the panel 11 can be evenly irradiated with the light. Accordingly, it is possible to obtain even images and improve the inspection accuracy.

The phosphor screen inspecting method will be described in detail below.

Figure 12:
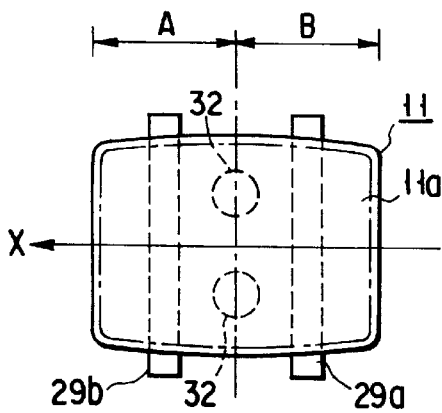
FIG. 12 is a plan view showing the positional relationship between a panel, illuminating means, and imaging means in the cathode ray type phosphor screen inspecting apparatus according to the first embodiment of the present invention.
Figure 13A:
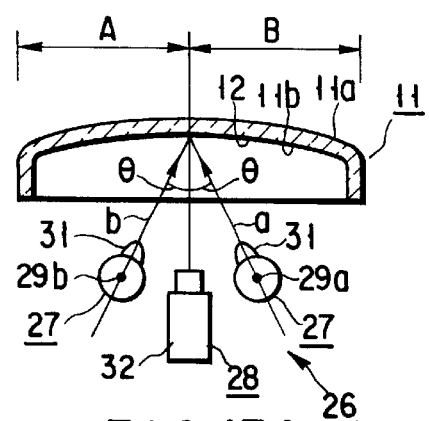
FIGS. 13A to 13C are views showing the positional relationship between the panel in motion, illuminating means, and imaging means in the cathode ray type phosphor screen inspecting apparatus according to the first embodiment of the present invention.
Figure 13B:
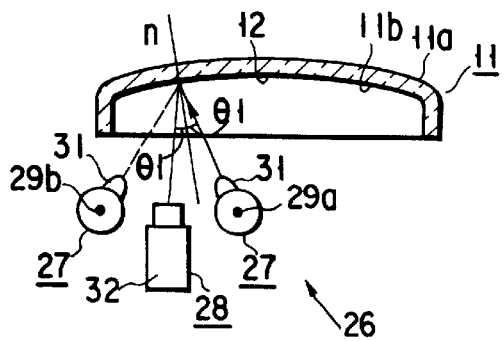
Figure 13C:
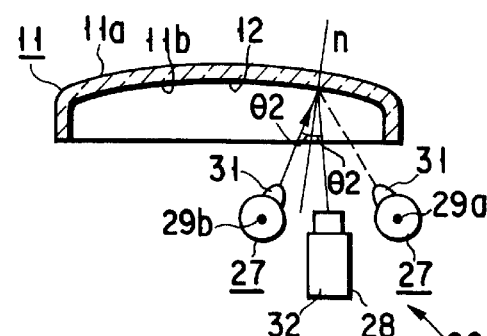

FIG. 12 is a plan view showing the positional relationship between the panel 11, the illuminating means 27 (light sources 29a and 29b), and the imaging means 28 (cameras 32). FIGS. 13A to 13C are views for explaining the relationship between the panel 11 in motion, the illuminating means 27 (light sources 29a and 29b), and the imaging means 28 (cameras 32).

As shown in FIG. 12, an inspection area is divided into two areas corresponding a first half A and a second half B of the panel 11 along the conveyance direction X of the panel 11. Control is so performed that the light source 29b mainly illuminates the first half A of the panel 11 and the light source 29a mainly illuminates the second half B of the panel 11.

FIG. 13A shows the inspection state of the center of the panel 11. The illumination axes of the light sources 29a and 29b incline the angle θ inward to the vertical axis, and the principal rays a and b of the illuminating light meet on the face inner surface 11b of the panel 11.

FIG. 13B shows the inspection state of the first half A of the panel 11. Since the face inner surface 11b of the panel 11 is curved, the amount of reflected light irradiated from the light source 29a and received by the cameras 32 of the imaging means 28 changes in accordance with the inspection position on the face inner surface 11b of the panel 11. The received light amount is a maximum when the light from the light source 29a is incident at an incident angle θ1 to a normal n to the face inner surface 11b of the panel 11 and the cameras 32 of the imaging means 28 receive light reflected at the same angle θ1. If this is the case, the received light amount abruptly increases, so the light-receiving elements of the cameras 32 of the imaging means 28 are overexposed.

FIG. 13C shows the inspection state of the second half B of the panel 11. Since the face inner surface 11b of the panel 11 is curved, the amount of reflected light irradiated from the light source 29b and received by the cameras 32 of the imaging means 28 changes in accordance with the inspection position on the face inner surface 11b of the panel 11. The received light amount is a maximum when the light from the light source 29b is incident at an incident angle θ2 to the normal n to the face inner surface 11b of the panel 11 and the cameras 32 of the imaging means 28 receive light reflected at the same angle θ2. If this is the case, the received light amount abruptly increases, so the light-receiving elements of the cameras 32 of the imaging means 28 are overexposed.

That is, when the amount of light irradiated from the illuminating means 27 is held constant, the reflected light from the face inner surface 11b of the panel 11 smoothly changes in the conveyance direction X because the face inner surface 11b has curvature. While the panel 11 is conveyed, however, if the reflected light from the face inner surface 11b enters the cameras 32 of the imaging means 28 at the same incident angle θ1 or θ2 of the light source 29a or 29b, the amount of light received by the light-receiving elements of the cameras 32 abruptly increases. Consequently, the light-receiving elements of the cameras 32 are overexposed, so the defect P can no longer be detected depending upon the received light amount ratio.

Figure 14:
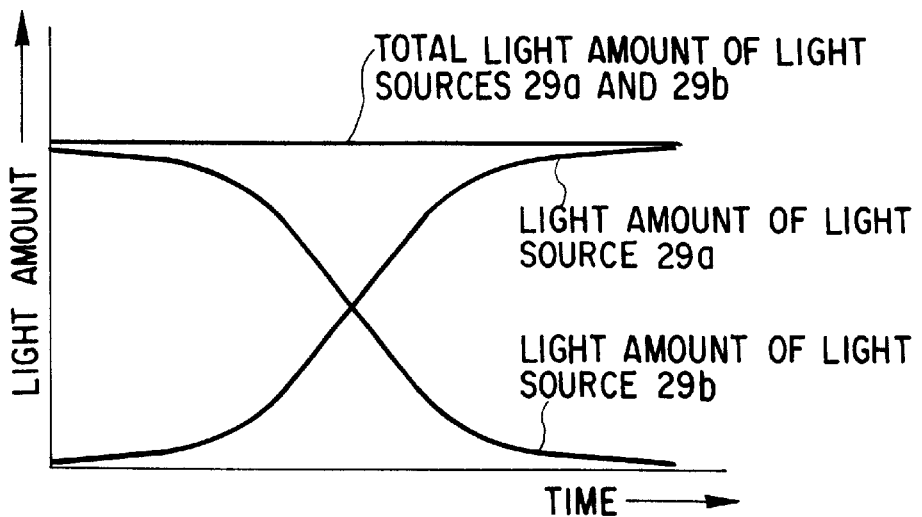
FIG. 14 is a graph showing the relationship between the elapsed time and the light amounts of light sources in the cathode ray type phosphor screen inspecting apparatus according to the first embodiment of the present invention.

As shown in FIG. 14, therefore, the light amounts of the light sources 29a and 29b are changed with the conveyance time of the panel 11.

More specifically, the light amounts of the light sources 29a and 29b are changed by changing the voltages applied to the light sources 29a and 29b with time while the total light amount of the light sources 29a and 29b are held substantially constant. Since the panel 11 is moving, the positional relationship between the panel 11 and the light sources 29a and 29b changes with time.

Accordingly, to inspect the first half A of the panel 11, the applied voltage to the light source 29a is lowered to decrease its light amount, and the applied voltage to the light source 29b is raised to increase its light amount. The light amount of the light source 29a is increased with the elapsed time, and the light amount of the light source 29b is decreased with the elapsed time. In this manner the applied voltages and light amounts of the light sources 29a and 29b are made equal at the center of the panel 11.

To subsequently inspect the second half B of the panel 11, the applied voltage to the light source 29a is raised to increase its light amount, and the applied voltage to the light source 29b is lowered to decrease its light amount. In this way the face inner surface 11b of the panel 11 can be evenly illuminated by changing the light amounts of the light sources 29a and 29b while the total light amount of the light sources 29a and 29b is held substantially constant.

In this embodiment, the applied voltages to the light sources 29a and 29b are controlled with time. However, these applied voltages can also be similarly controlled in accordance with position information of the panel 11 obtained by a panel position detector (not shown).

As described above, the first half A of the panel 11 is inspected by mainly detecting the reflected light from the light source 29a, and the second half B of the panel 11 is inspected by mainly detecting the reflected light from the light source 29b. This prevents maximum reflected light from entering the cameras 32 of the imaging means 28. Consequently, the light-receiving elements of the cameras 32 are not overexposed, and high-accuracy inspection can be performed.

In the phosphor screen inspecting method of the present invention as described above, the phosphor screen on the face inner surface 11b of the panel 11 is illuminated, and the reflected light from the phosphor screen is imaged. Since the defect P on the phosphor screen is specified from this imaging data, the black film 12 and phosphor films on the phosphor screen can be automatically inspected with high accuracy.

Additionally, inspection is performed by imaging the reflected light from the face inner surface 11b on which the phosphor screen is formed. Therefore, foreign matter such as dust or dag sticking to the face outer surface has no influence on inspection, so the inspection accuracy can be improved.

For example, as a method of automatically inspecting a defect on the phosphor screen, it is possible to illuminate the face 11a of the panel 11 from the inner surface, image the light transmitted through the phosphor screen from the outer surface of the face 11a, and pinpoint a defect by image processing. In this method, the image to be processed is the light transmitted through the apertures 13. In the case of the black film 12, as shown in FIG. 15A, the image is black except for the apertures 13 because the light transmitted through the apertures 13 is detected. However, if foreign matter such as dust or dag is sticking to the face outer surface of the panel 11, the transmitted light is intercepted by this foreign matter. Consequently, it is determined that the black film 12 has a defect P (a deformed hole P2 or a no-aperture portion P3).

Furthermore, inspection can be automatically performed while the panel 11 is moved. During inspection, the light amount of the illuminating means 27 is changed in accordance with the movement of the panel 11. Hence, even when the amount of reflected light entering the imaging means 28 greatly changes in accordance with the shape of the face inner surface 11b, it is possible to prevent overflow (overexposure) of the amount of reflected light entering the imaging means 28. So the inspection accuracy can be improved.

Moreover, when a plurality of illuminating means 27 are used, the light amount of each illuminating means 27 is so changed that the total amount of light irradiated from these illuminating means 27 onto the face inner surface 11b remains unchanged. Consequently, the face inner surface 11b can be evenly illuminated, and the inspection accuracy can be improved.

Figure 16:
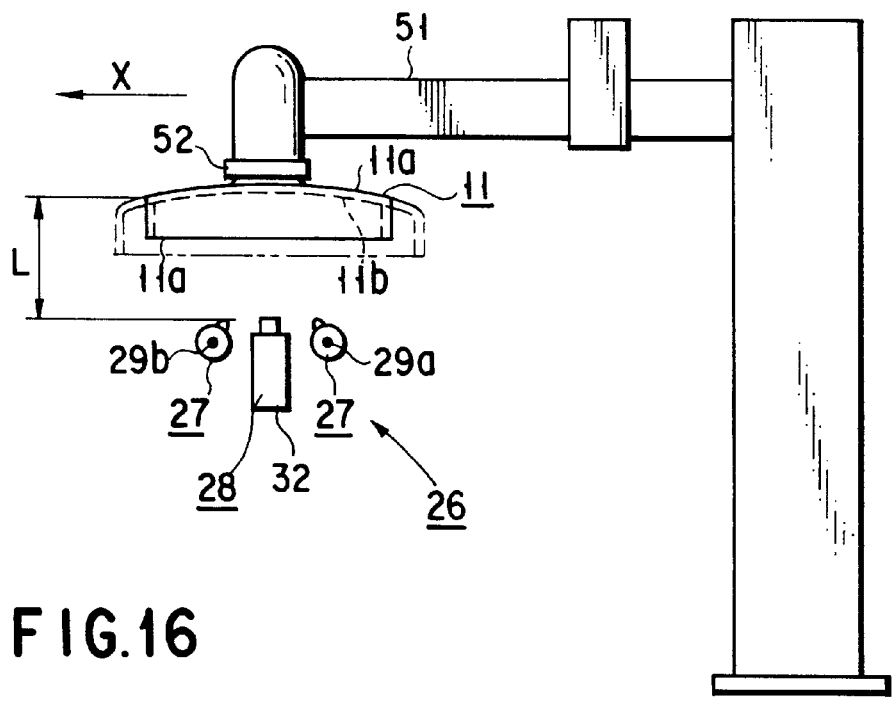
FIG. 16 is a side view showing a cathode ray tube phosphor screen inspecting apparatus according to the second embodiment of the present invention.

The second embodiment of the present invention will be described below with reference to FIG. 16. The same reference numerals as in the first embodiment denote the same parts and functions in the second embodiment, and a detailed description thereof will be omitted.

In this embodiment, panel holding means 52 of a robot 51 as moving means and distance adjusting means holds a panel 11. In this state, the panel 11 can be inspected by moving it above a detecting unit 26. Even when the size of the panel 11 changes, the robot 51 changes the conveyance height of a seal surface 11d of the panel 11. Consequently, a distance L (illumination distance and imaging distance) from light sources 29a and 29b and imaging means 28 to a face inner surface 11b of the panel 11 can be held constant.

Accordingly, inspection can be accurately performed in accordance with the shape of the panel 11. Additionally, the embodiment is applicable to automatic inspection on a multi-product production line, so accurate inspection can be performed regardless of the size of the panel 11.

Figure 17:
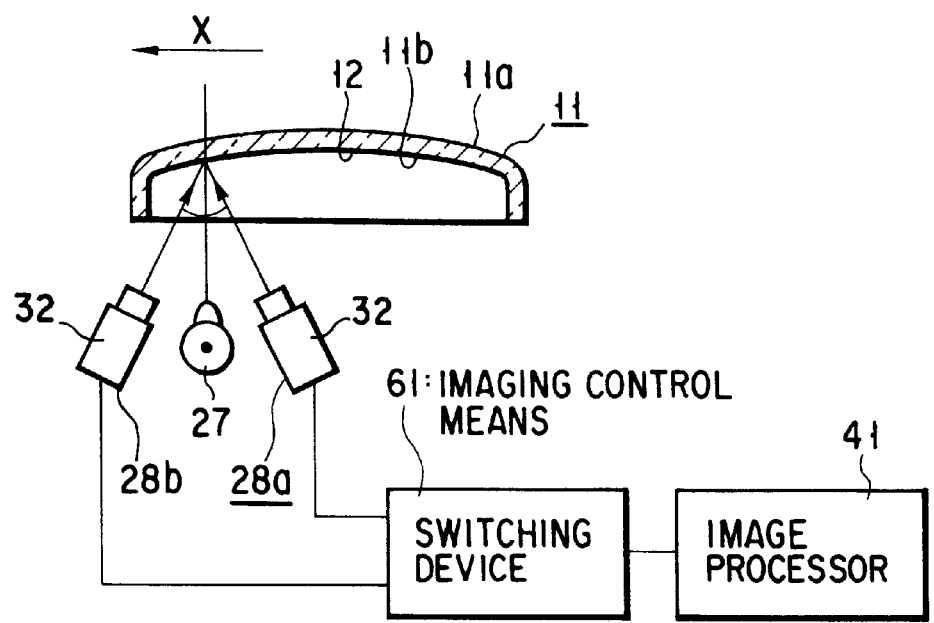
FIG. 17 is a view for explaining a cathode ray tube phosphor screen inspecting apparatus according to the third embodiment of the present invention.

The third embodiment of the present invention will be described below with reference to FIG. 17. The same reference numerals as in the above embodiments denote the same parts and functions in the third embodiment, and a detailed description thereof will be omitted.

In this embodiment, one illuminating means 27 is disposed in a conveyance direction X, and two imaging means 28a and 28b are disposed on the two sides of this illuminating means 27.

To inspect a phosphor screen on a face inner surface 11b of a panel 11 by moving the panel 11 in the conveyance direction X, the imaging means 28b images the first half of the panel 11, and the imaging means 28a images the second half of the panel 11. A switching device 61 as imaging control means switches the imaging means 28a and 28b.

When the amount of reflected light entering the imaging means 28a and 28b largely changes in accordance with the shape of the face inner surface 11b of the panel 11 and so the amount of reflected light entering one of the imaging means 28a and 28b overflows (overexposed), inspection can be performed by the other one of the imaging means 28a and 28b. Hence, the inspection accuracy can be improved.

As described above, the phosphor screen inspecting apparatus 21 with high reliability can be constructed by controlling the voltages applied to the light sources 29a and 29b, such that even reflected light enters the imaging means 28, or by switching the imaging means 28a and 28b, when the reflected light from the phosphor screen formed on the face inner surface 11b of the panel 11 is detected. Since inspection can be performed while the panel 11 is moved, a system suited to automatization can be constructed.

In the first to third embodiments described above, defect inspection of the black film 12 is described. However, similar effects can be obtained when the present invention is applied to defect inspection of dot missing by which no phosphor adheres to an hole 13 in a panel 11 in which holes 13 of a black film 12 are coated with blue, green, and red phosphors.

Also, the panel 11 is moved in each of the above embodiments. However, similar effects can be obtained when the detecting unit 26 is moved while the panel 11 is fixed, or when the panel 11 and the detecting unit 26 are moved relative to each other.

The fourth embodiment of the present invention will be described below with reference to FIGS. 18 to 21. The same reference numerals as in the above embodiments denote the same parts and functions in the fourth embodiment, and a detailed description thereof will be omitted.

Figure 18:
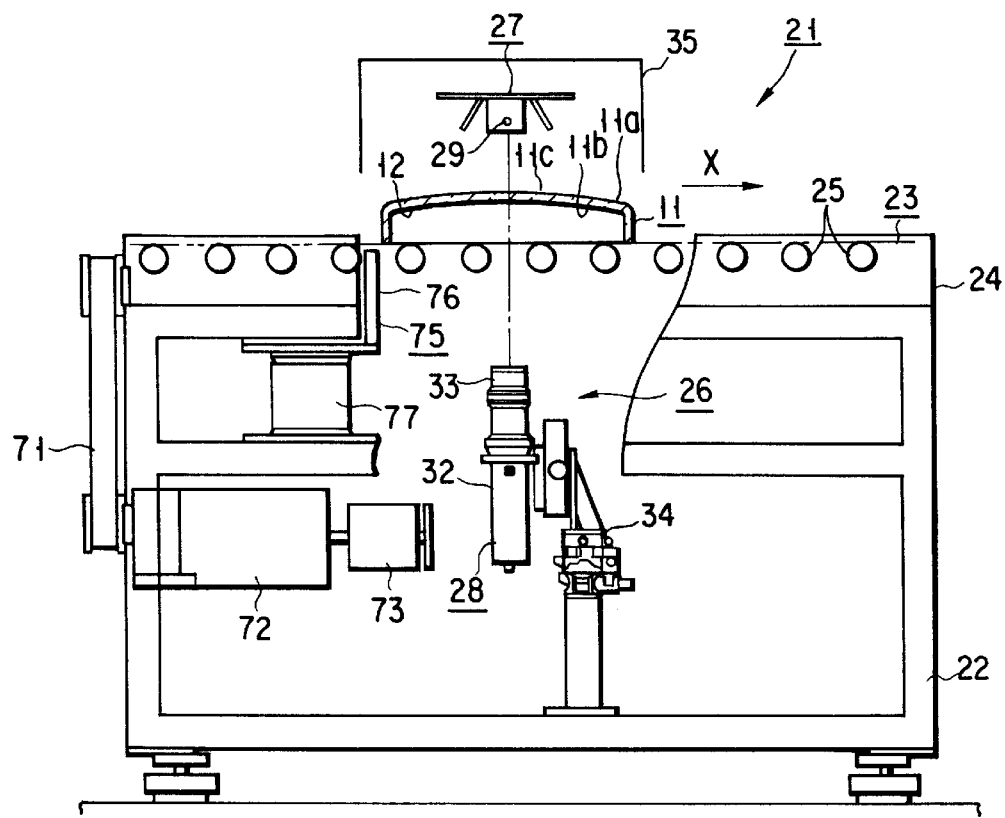
FIG. 18 is a partially cutaway side view showing a cathode ray tube phosphor screen inspecting apparatus according to the fourth embodiment of the present invention.
Figure 19:
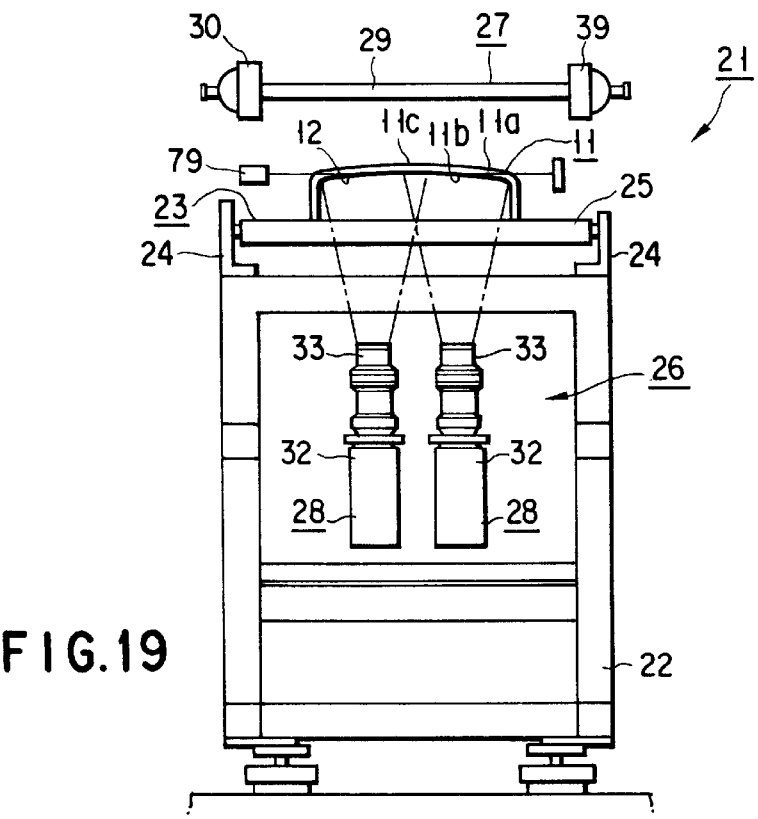
FIG. 19 is a front view of the phosphor screen inspecting apparatus shown in FIG. 18.

This embodiment is a transmission phosphor screen inspecting apparatus 21 in which, as shown in FIGS. 18 and 19, a panel 11 is conveyed on rollers 25 of a conveyor 23 in a conveyance direction X indicated by an arrow in FIG. 18 with a face outer surface (face surface) 11c facing up.

The conveyor 23 is driven by a conveyor motor 72 via drive transmitting means 71. An encoder 73 is coupled to the conveyor motor 72 and outputs pulses proportional to the rotational angle of the conveyor motor 72.

A positioning device 75 for positioning the panel 11 conveyed by the conveyor 23 is disposed on the upstream side of the conveyor 23. This positioning device 75 includes a stopper 76 which moves up and down between two rollers 25 and a driver 77 such as a cylinder which allows the vertical motion of the stopper 76. The positioning device 75 also includes a panel size sensor (not shown) which senses the size of the panel 11 at the same time the panel 11 is positioned.

On the downstream side of the positioning device 75 along the conveyor 23, illuminating means 27 facing down is disposed above a portion between two rollers 25, and cameras 32 of imaging means 28 face up and are disposed below the portion between these rollers 25.

The illuminating means 27 has a linear light source 29 such as a long halogen lamp. The two ends of this light source 29 are connected to a pair of sockets 30. The whole illuminating means 27 is covered with a light-shielding cover 35 open downward. The imaging means 28 is so disposed that the direction of alignment of line sensor pixels is perpendicular to the axis of the conveyance direction of the panel 11.

In this embodiment, the cameras 32 are disposed underneath the conveyor 23 to directly image and inspect a face inner surface 11b of the panel 11 because in this position the cameras 32 are not easily influenced by, e.g., water droplets sticking to a face outer surface 11c of the panel 11.

Figure 20A:
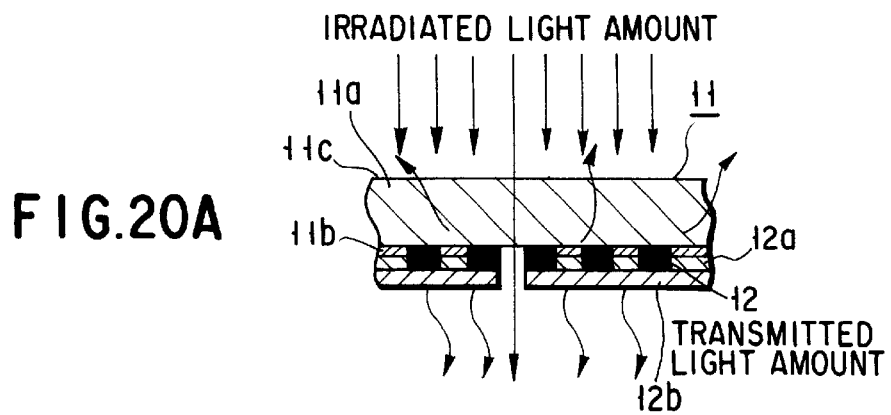
FIG. 20A is a sectional view of the phosphor screen inspecting apparatus shown in FIG. 18.

That is, the face inner surface 11b of the panel 11 inspected in the first to third embodiments is coated only with a film called the black film (BC (Black Coating) film) 12. However, the face inner surface 11b of the panel 11 inspected in this fourth embodiment is also coated with phosphors of blue B, green G, and red R and a material called a filter. Therefore, as shown in FIG. 20A, the image obtained by the transmission imaging means 28 of this embodiment is not easily affected by the face outer surface 11c of the panel 11 due to the diffusion effect of a filter film 12a, the black film 12, and an SC (Coating) film 12b formed on the face inner surface 11b of the panel 11.

Figure 20B:
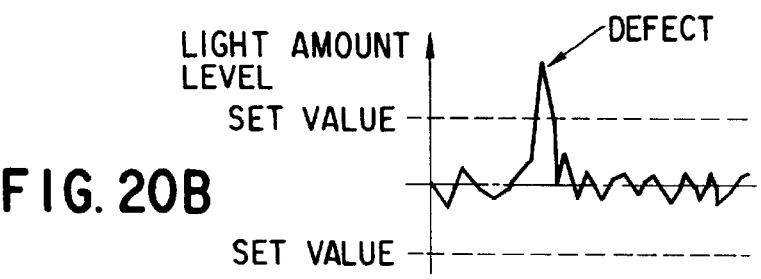
FIG. 20B is a graph showing an abnormal transmitted light amount resulting from a defect in an SC film.

FIG. 20B is a graph showing an abnormal transmitted light amount resulting from a defect on the SC film 12b. In FIG. 20B, the abscissa indicates the position, and the ordinate indicates the light amount level. Also, if imaging is performed through glass from the face outer surface 11c of the panel 11, water droplets sticking to the face outer surface 11c sometimes produce a lens effect to make accurate inspection impossible to perform.

A sensor 79 for sensing the leading edge of the panel 11 in its conveyance direction X is disposed in a position corresponding to the imaging position of the cameras 32 of the imaging means 28.

Figure 21:
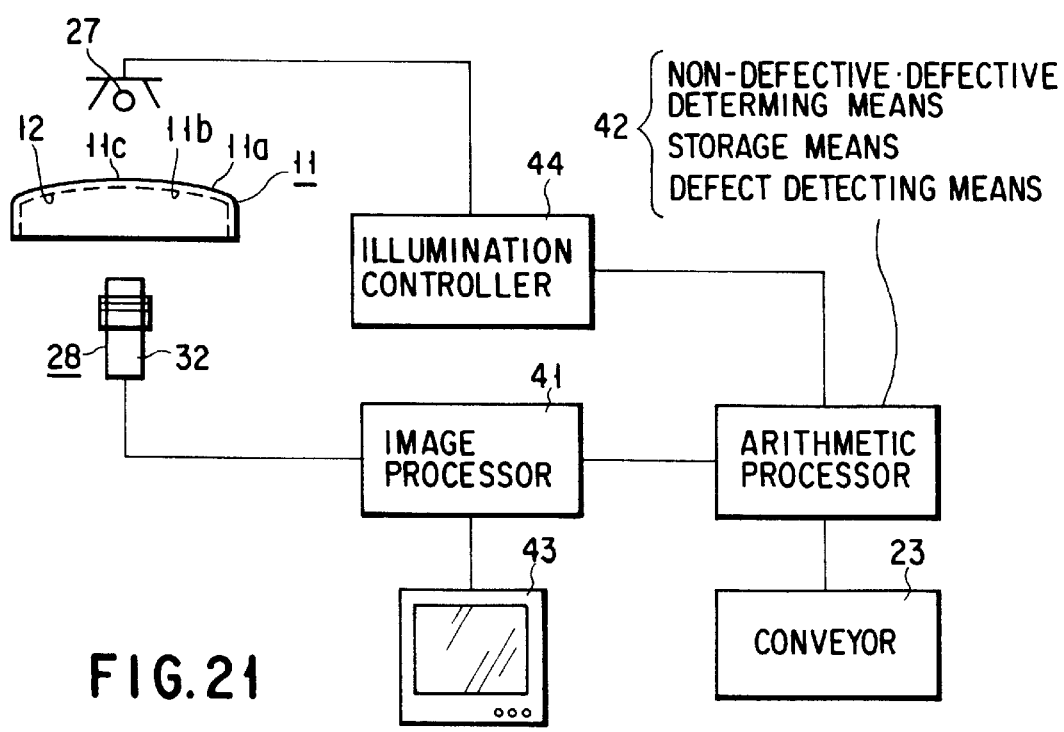
FIG. 21 is a block diagram showing the arrangement of the cathode ray tube phosphor screen inspecting apparatus according to the fourth embodiment of the present invention.

FIG. 21 is a block diagram showing the arrangement of the phosphor screen inspecting apparatus shown in FIGS. 18 and 19. Referring to FIG. 21, the cameras 32 of the imaging means 28 are connected to an arithmetic processor 42 via an image processor 41. An output from the image processor 41 is displayed on a monitor display 43. The light source 29 of the illuminating means 27 is connected to the arithmetic processor 42 via an illumination controller 44. An output from the encoder 73 of the conveyor 23 is applied to the arithmetic processor 42.

The arithmetic processor 42 has the function of defect detecting means for specifying a defect on a phosphor screen from imaging data obtained by the imaging means 28, the function of storage means for storing non-defective·defective determination conditions defining non-defective·defective of the position and pattern of a defect on a phosphor screen, and the function of non-defective·defective determining means for collating a defect specified on a phosphor screen by the defect detecting means with the non-defective·defective determination conditions stored in the storage means, thereby determining whether the phosphor screen is non-defective or defective.

A phosphor screen inspecting method using the above phosphor screen inspecting apparatus will be described below.

When the panel 11 is conveyed downstream by the conveyor 23, the positioning device 75 positions the panel 11. Simultaneously, the sensor (not shown) of the positioning device 75 senses the size of the panel 11.

After that, the positioning device 75 releases the panel 11 and the panel 11 is conveyed downstream. The sensor 79 senses the leading edge of the panel 11 in its advancing direction (conveyance direction X). A signal from the sensor 79 is input as an inspection start signal to the arithmetic processor 42. At this timing, the end portion of the effective surface (phosphor screen) of the face inner surface 11b of the panel 11 is detected in the imaging position of the cameras 32 of the imaging means 28.

From this inspection start timing, the illuminating means 27 illuminates the panel 11 conveyed at a fixed speed by the conveyor 23, and the cameras 32 of the imaging means 28 image (detect) the transmitted light.

The image processor 41 processes the images obtained by the cameras 32 of the imaging means 28, and the arithmetic processor 42 specifies a defect. That is, the arithmetic processor 42 counts output pulses from the encoder 73 of the conveyor 23 and specifies the X and Y coordinates of the position of a defect in accordance with the correspondence between the moving distance of the panel 11 and the imaging data from the cameras 32.

If a defect is found after the entire phosphor screen of the panel is scanned (inspected), the arithmetic processor 41 checks the pattern of the defect and subsequently checks whether the phosphor screen is non-defective or defective in accordance with the position of the defect on the effective surface (phosphor screen) of the panel 11.

Patterns of dot missing as a defect and a method of determining whether dot missing is non-defective or defective in accordance with the pattern will be described below with reference to FIGS. 4A to 7B.

FIGS. 4A and 4B show missing of a set of three dots of blue B, green G, and red R forming one pixel. In FIG. 4A, three dots of blue B, green G, and red R horizontally arranged in a line are missing. In FIG. 4B, three dots of blue B, green G, and red R adjacent to each other in the form of a triangle are missing. In either case, it is determined that the dot missing is non-defective if only one set of dots are missing and defective if two or more sets of dots are missing.

FIGS. 5A and 5B show missing of two adjacent dots of the same color. In FIG. 5A, two dots of blue B horizontally adjacent to each other are missing. In FIG. 5B, two dots of blue B adjacent to each other in different rows are missing. In either case, it is determined that the dot missing is defective.

Figure 6B:
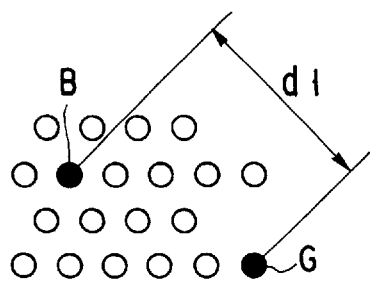

FIGS. 6A and 6B show missing of two adjacent dots of two different colors. In FIG. 6A, two adjacent dots of blue B and green G are missing, and it is, for example, determined that this dot missing is defective. In FIG. 6B, two dots of blue B and green G at a distance d1 are missing. It is determined that this dot missing is non-defective if, for example, the distance d1 is 50 mm or more and defective if the distance d1 is 50 mm or less. Also, even when two dots of the same color are missing, it is determined that this dot missing is non-defective if the distance d1 is 50 mm or more.

Figure 7A:
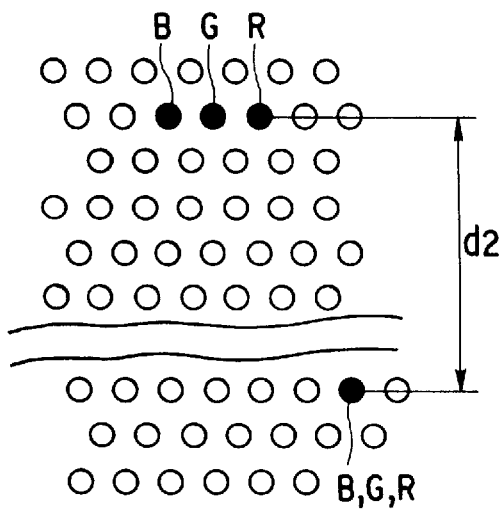
FIGS. 7A and 7B are views showing defects in the phosphor screen formed on the panel inner surface of the cathode ray tube.
Figure 7B:
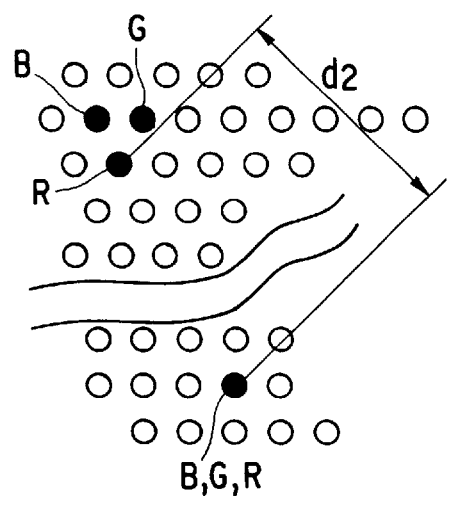

FIGS. 7A and 7B show missing of one set of dots and another dot at a distance d2. It is determined that this dot missing is non-defective if, for example, the distance d2 is 50 mm or more and defective if the distance d2 is 50 mm or less.

Figure 8:
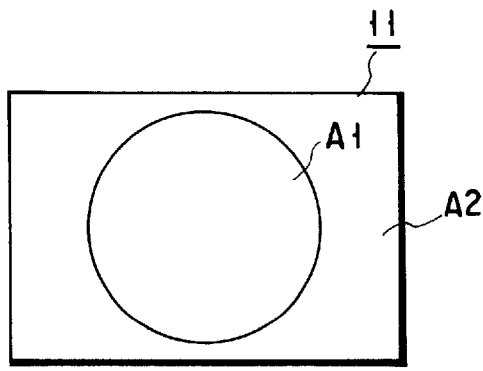
FIG. 8 is a view showing a region for specifying the position of a defect in the phosphor screen formed on the panel inner surface of the cathode ray tube.

A method of determining whether dot missing is non-defective or defective in accordance with the position of the dot missing on the effective surface (phosphor screen) of the panel 11 will be described below with reference to FIG. 8.

Assume, for example, that a central circle on the effective surface of the panel 11 is a region A1 and its outside portion is a region A2. If this is the case, the region A1 is required to be defect-free, and the above defect standards are applied to the region A2.

As described above, a specified defect on a phosphor screen is collated with non-defective·defective determination conditions defining non-defective·defective of the position and pattern of a defect on a phosphor screen, thereby checking whether the phosphor screen is non-defective or defective. Consequently, inspection for defects on a phosphor screen can be automatically performed with high accuracy.

Additionally, the non-defective·defective determination conditions based on the pattern and position of a defect are prestored in the storage means of the arithmetic processor 42 in accordance with the type and size of display tube. This allows automatic inspection on a multi-product production line.

Figure 22:
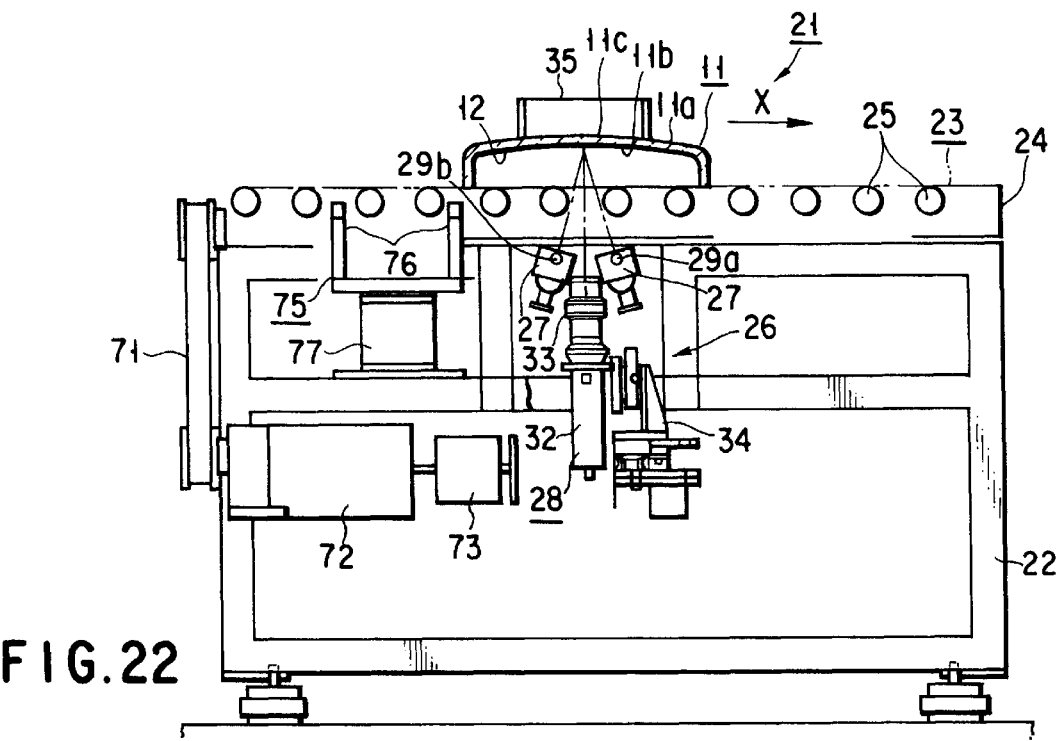
FIG. 22 is a partially cutaway side view showing a cathode ray tube phosphor screen inspecting apparatus according to the fifth embodiment of the present invention.

The fifth embodiment of the present invention will be described below with reference to FIG. 22. The same reference numerals as in the first embodiment denote the same parts and functions in the fifth embodiment, and a detailed description thereof will be omitted.

This embodiment is a reflection phosphor screen inspecting apparatus 21 similar to that of the first embodiment. This phosphor screen inspecting apparatus 21 specifies a defect on a phosphor screen by illumination and imaging from a face inner surface 11b of a panel 11. Accordingly, inspection for defects on a phosphor screen can be automatically performed with high accuracy. Note that the parts except for a detecting unit 26 are the same as in the fourth embodiment described above.

As in the fourth embodiment, a specified defect on a phosphor screen is collated with non-defective·defective determination conditions defining non-defective·defective of the position and pattern of a defect on a phosphor screen, thereby checking whether the phosphor screen is non-defective or defective. Consequently, inspection for defects on a phosphor screen can be automatically performed with high accuracy.

In the first to third embodiments described previously, therefore, as in the fourth and fifth embodiments, a specified defect on a phosphor screen can be collated with non-defective·defective determination conditions defining non-defective·defective of the position and pattern of a defect on a phosphor screen, thereby checking whether the phosphor screen is non-defective or defective. Consequently, inspection for defects on a phosphor screen can be automatically performed with high accuracy.

The sixth embodiment of the present invention will be described below with reference to FIGS. 23 to 26B. The same reference numerals as in the above embodiments denote the same parts and functions in the sixth embodiment, and a detailed description thereof will be omitted.

Figure 23:
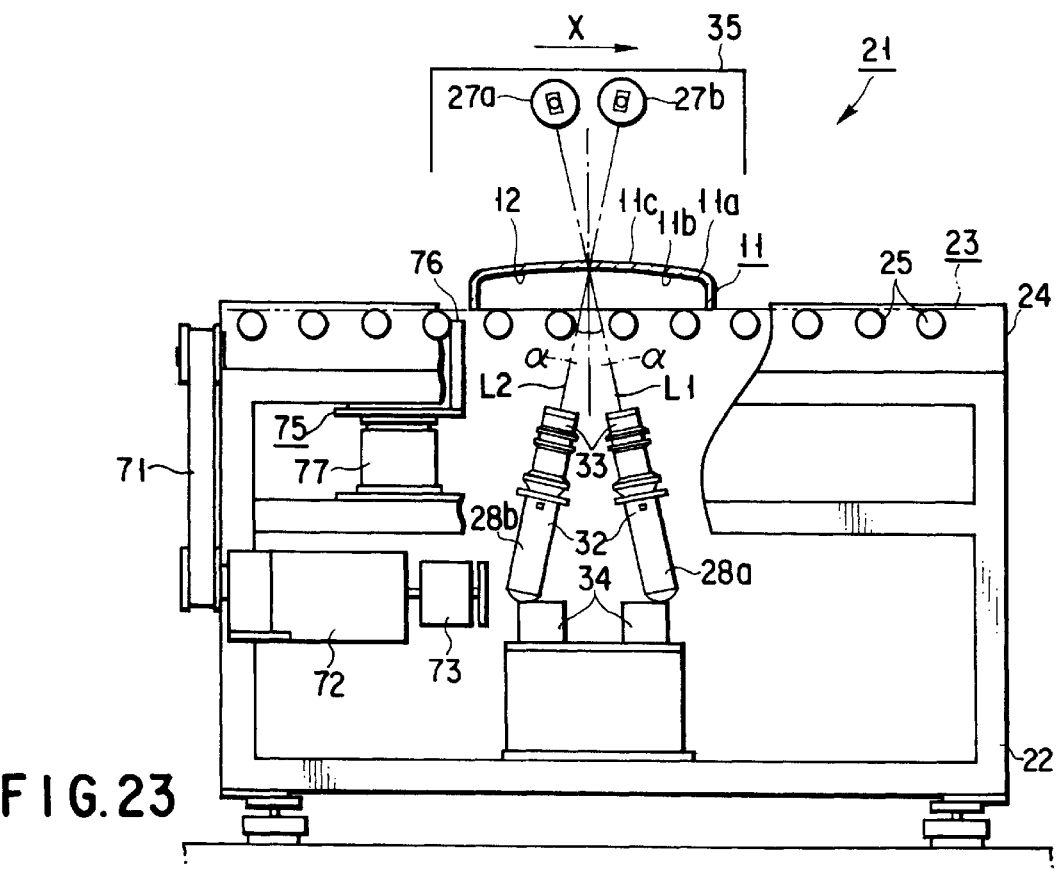
FIG. 23 is a partially cutaway side view showing a cathode ray tube phosphor screen inspecting apparatus according to the sixth embodiment of the present invention.
Figure 24:
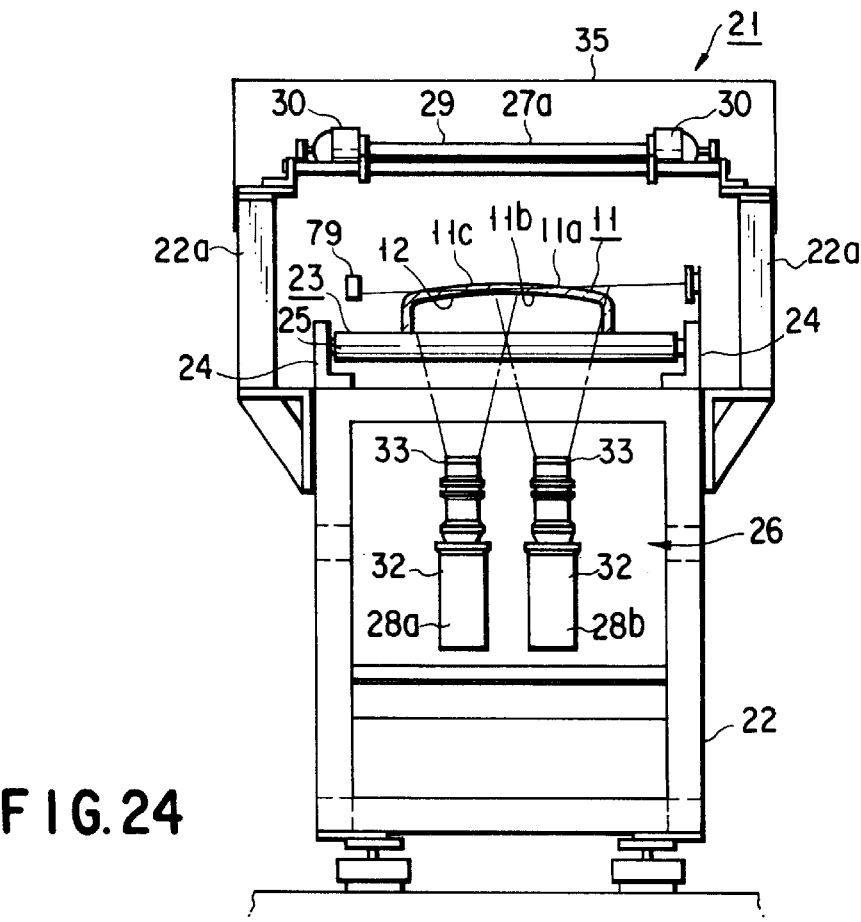
FIG. 24 is a front view of the phosphor screen inspecting apparatus shown in FIG. 23.

This embodiment is a transmission phosphor screen inspecting apparatus 21 shown in FIGS. 23 and 24. The parts except for a detecting unit 26 are the same as in the fourth and fifth embodiments described above.

The detecting unit 26 has a pair of illuminating units 27a and 27b facing down and disposed above a conveyor 23, and a pair of imaging means 28a and 28b facing up and disposed below the conveyor 23. These illuminating means 27a and 27b and imaging means 28a and 28b are juxtaposed in a conveyance direction X of a panel 11.

The imaging means 28a and 28b are disposed via a camera adjusting mechanism 34 such that optical axes L1 and L2 of the imaging means 28a and 28b intersect on the phosphor screen of the panel 11 through two rollers 25 and symmetrically incline a predetermined angle α to an axis perpendicular to the phosphor screen. These imaging means 28a and 28b are focused on the phosphor screen. This embodiment uses two pairs of such imaging means 28a and 28b, i.e., a total of four imaging means. The inclination angle α is set from 5 to 15°.

The illuminating means 27a and 27b are so disposed as to irradiate illuminating light along the optical axes L1 and L2 of the imaging means 28a and 28b, respectively. These illuminating means 27a and 27b are supported by support frames 22a vertically extending from the two sides of a frame 22. A light-shielding cover 35 is also attached to these support frame 22a.

Figure 25:
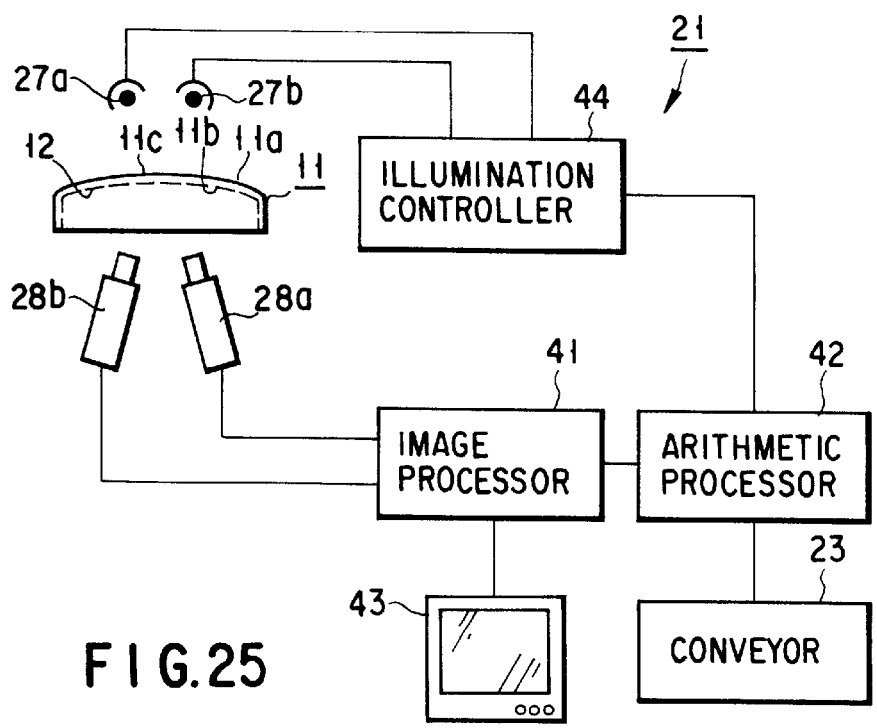
FIG. 25 is a block diagram showing the arrangement of the cathode ray tube phosphor screen inspecting apparatus according to the sixth embodiment of the present invention.

Referring to FIG. 25, the imaging means 28a and 28b are connected to an image processor 41, and the illuminating means 27a and 27b are connected to an illumination controller 44. An arithmetic processor 42 has the function of defect detecting means for specifying a potential defective portion imaged and detected in a plurality of directions at the same time by the imaging means 28a and 28b as a defect on a phosphor screen.

A phosphor screen inspecting method using the above apparatus shown in FIGS. 23 to 25 will be described below.

When the panel 11 is conveyed downstream by the conveyor 23, a positioning device 75 positions the panel 11. Simultaneously, a sensor (not shown) of the positioning device 75 senses the size of the panel 11.

After that, the positioning device 75 releases the panel 11 and the panel 11 is conveyed downstream. A sensor 79 senses the leading edge of the panel 11 in its advancing direction (conveyance direction X). A signal from the sensor 79 is input as an inspection start signal to the arithmetic processor 42. At this timing, the end portion of an effective surface (phosphor screen) of a face inner surface 11b of the panel 11 is detected in the imaging position of cameras 32 of the imaging means 28a and 28b.

From this inspection start timing, the illuminating means 27a and 27b simultaneously illuminate the panel 11 conveyed at a fixed speed by the conveyor 23, and the cameras 32 of the imaging means 28a and 28b simultaneously image (detect) the transmitted light.

The image processor 41 processes the images simultaneously obtained by the cameras 32 of the imaging means 28a and 28b, and the arithmetic processor 42 locates a defect if any. That is, the arithmetic processor 42 counts output pulses from an encoder 73 of the conveyor 23 and specifies the X and Y coordinates of the position of a defect in accordance with the correspondence between the moving distance of the panel 11 and the imaging data from the cameras 32.

If the phosphor screen of the panel 11 has a defect P as shown in FIG. 26A, the imaging means 28a and 28b simultaneously detect this defect P with no time difference. Therefore, the arithmetic processor 42 specifies this defect as the defect P on the phosphor screen.

If foreign matter Q is sticking to a face outer surface 11c of the panel 11 as shown in FIG. 26B, the imaging means 28a first detects this foreign matter Q. The other imaging means 28b detects the foreign matter Q after the panel 11 moves a distance D in the conveyance direction X. That is, these imaging means 28a and 28b detect the foreign matter Q with a certain time difference. If a substance is thus detected with a time difference, this substance is not a defect P on the phosphor screen which is detected by the two imaging means at the same time. Hence, this substance is specified as foreign matter Q.

The foreign matter Q is, e.g., a dust particle, a spat of the black film, or a water droplet and can be removed by wiping the face outer surface 11c of the panel 11.

When a defect is detected after the entire phosphor screen of the panel 11 is scanned (inspected), as described above, the arithmetic processor 42 first checks the pattern of the defect and subsequently checks whether the phosphor screen is non-defective or defective in accordance with the position of the defect on the effective surface (phosphor screen) of the panel 11.

As described above, illumination is performed from the face outer surface 11c of the panel 11, and light transmitted through the same position of the phosphor screen of the panel 11 is imaged in a plurality of directions at the same time. The defect P on the phosphor screen is detected in a plurality of imaging directions at the same time. Therefore, this defect is specified as the defect P on the phosphor screen. On the other hand, whether the foreign matter Q sticking to the face outer surface 11c is detected or not detected depends upon the imaging direction. Even when the foreign matter Q is detected in a plurality of imaging directions, it is detected with certain time differences. That is, the foreign matter Q is not detected in a plurality of imaging directions at the same time. This allows this foreign matter to be specified as the foreign matter Q, not as the defect P on the phosphor screen.

Additionally, the illuminating means 27a and 27b illuminate in a plurality of directions opposite to a plurality of imaging directions. Consequently, the defect P or the foreign matter Q can be reliably imaged, and the inspection accuracy can be improved.

Furthermore, the imaging means 28a and 28b are juxtaposed along the moving direction of the panel 11 and symmetrically inclined 5 to 15° to the axis perpendicular to the phosphor screen of the panel 11. Accordingly, it is possible to reliably distinguish between the defect P on the phosphor screen and the foreign matter Q on the face outer surface 11c. That is, if the inclination angle is smaller than 5°, the inclination is too perpendicular to the phosphor screen, so the defect P and the foreign matter Q are difficult to distinguish. If the inclination angle is larger than 15°, the inclination is too oblique to the phosphor screen, so the defect P on the phosphor screen can no longer be reliably detected.

The seventh embodiment of the present invention will be described below with reference to FIG. 27. The same reference numerals as in the above embodiments denote the same parts and functions in the seventh embodiment, and a detailed description thereof will be omitted.

This embodiment includes distance adjusting means 81 for holding the distance between a face inner surface 11b of a panel 11 and imaging means 28a and 28b constant in addition to the arrangement of the sixth embodiment. The imaging means 28a and 28b are disposed on a base 83 which is vertically moved by a uniaxial servo mechanism 82. In synchronism with the movement of the panel 11 by a conveyor 23, the imaging means 28a and 28b are vertically moved such that these imaging means 28a and 28b view and focus the same point on the phosphor screen of the panel 11. This allows accurate inspection. The curvatures of the face inner surfaces 11b of the panels 11 of various types are known. Therefore, an arithmetic processor 42 obtains the moving amount of the panel 11 by a signal from an encoder 73 and controls the servo mechanism 82 to vertically move the imaging means 28a and 28b.

The eighth embodiment of the present invention will be described below with reference to FIG. 28. The same reference numerals as in the above embodiments denote the same parts and functions in the eighth embodiment, and a detailed description thereof will be omitted.

This embodiment includes distance adjusting means 81 for holding the distance between a face inner surface 11b of a panel 11 and imaging means 28a and 28b constant in addition to the arrangement of the sixth embodiment. The imaging means 28a and 28b are disposed on a base 87 which is supported to be vertically movable by a plurality of guide posts 85 and vertically moved by a cam 86 fixed to the output shaft of a motor (not shown).

In synchronism with the movement of the panel 11 by a conveyor 23, the imaging means 28a and 28b are vertically moved such that these imaging means 28a and 28b view and focus the same point on the phosphor screen of the panel 11. This allows accurate inspection.

The curvatures of the face inner surfaces 11b of the panels 11 of various types are known. Therefore, an arithmetic processor 42 obtains the moving amount of the panel 11 by a signal from an encoder 73 and controls a servo mechanism 82 to vertically move the imaging means 28a and 28b.

In the sixth to eighth embodiments, the illuminating means 27a and 27b are disposed above the panel 11, and the imaging means 28a and 28b are disposed below the panel 11. However, it is also possible to dispose the imaging means 28a and 28b and the illuminating means 27a and 27b above and below, respectively, of the panel 11. That is, it is also possible to allow the illuminating means 27a and 27b to illuminate from the face inner surface 11b of the panel 11 and the imaging means 28a and 28b to image the transmitted light.

In this arrangement, the objective surfaces of lenses 33 of the imaging means 28a and 28b face down. So, it is possible to prevent adhesion of dust particles and foreign matter to the objective surfaces of the lenses 33 and maintain high imaging quality.

Additionally, the accuracy with which the foreign matter Q is detected can be further improved by using three or more imaging means 28a and 28b and three or more illuminating means 27a and 27b, instead of pairs of these means.

Furthermore, the panel 11 is moved in each of the above embodiments. However, similar effects can be obtained when the detecting unit 26 is moved while the panel 11 is fixed or when the panel 11 and the detecting unit 26 are moved relative to each other.

Also, each embodiment is applicable to inspection for defects on the black film 12 and inspection for defects such as dot missing by which no phosphor adheres to the aperture 13 in the panel 11 dust defect by which a foreign substance adheres to the phosphor screen, in which the apertures 13 in the black film 12 are coated with blue, green, and red phosphors.

According to the present invention, a panel is illuminated and imaged, and a defect on a phosphor screen of the panel is specified from the imaging data. Consequently, inspection for defects on the phosphor screen can be automatically performed with high accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cathode ray tube phosphor screen inspecting method comprising:
   illuminating a panel of a cathode ray tube with light, in which a phosphor screen having a regular pattern is formed on an inner surface of a face of the panel, from the inner surface side of said face;
   imaging a light image reflected from the inner surface of said face; and
   specifying a defect on said phosphor screen from data obtained by said imaging;
   wherein said panel, and illuminating means for illumination and imaging means for imaging are moved relative to each other, and an amount of light from said illuminating means is changed in accordance with the relative movement such that the amount of illumination at an imaging position on said panel remains unchanged; and
   wherein a plurality of illuminating means are juxtaposed in a direction of movement relative to said panel, and an amount of light from each illuminating means is changed such that a total amount of light irradiated from said plurality of illuminating means onto the face inner surface remains unchanged.

2. A method according to claim 1, further comprising the step of collating the specified defect on said phosphor screen with non-defective·defective determination conditions defining non-defective·defective of a position and pattern on a phosphor screen, thereby determining whether said phosphor screen is non-defective or defective.

3. A method according to claim 1, wherein an imaging distance to the inner surface of said face is kept constant.

4. A cathode ray tube phosphor screen inspecting method comprising:
   illuminating a panel of a cathode ray tube, in which a phosphor screen having a regular pattern is formed on an inner surface of a face, from the inner surface or an outer surface of said face;
   imaging light components transmitted through the same position on said phosphor screen of said panel in a plurality of directions at the same time;
   moving an imaging position relative to said phosphor screen of said panel;
   keeping the amount of illumination at said imaging position on said panel unchanged; and
   specifying a potential defective portion detected by the simultaneous imaging in a plurality of directions as a defect on said phosphor screen;
   wherein the illumination is performed in a plurality of directions opposite to the imaging directions.

5. A method according to claim 4, further comprising the step of collating the specified defect on said phosphor screen with non-defective·defective determination conditions defining non-defective·defective of a position and pattern on a phosphor screen, thereby determining whether said phosphor screen is non-defective or defective.

6. A cathode ray tube phosphor screen inspecting apparatus comprising:
   an illuminating mechanism illuminating a panel of a cathode ray tube with light, in which a phosphor screen having a regular pattern is formed on an inner surface of a face of the panel, from the inner surface side of said face;
   an arrangement imaging a light image reflected from the inner surface of said face;
   a defect detecting mechanism specifying a defect on said phosphor screen from imaging data obtained by said imaging mechanism; and
   moving means for moving said panel, and illuminating means and imaging means relative to each other; and illumination control means for changing a light amount of said illuminating means in accordance with the relative movement such that the amount of illumination at an imaging position on said panel remains unchanged;
   wherein a plurality of illuminating means are juxtaposed in a direction of movement relative to said panel, and an amount of light from each illuminating means is changed such that a total amount of light irradiated from said plurality of illuminating means onto the face inner surface remains unchanged.

7. An apparatus according to claim 6, wherein a plurality of imaging means are juxtaposed in a direction of movement relative to said panel, further comprising:
   moving means for moving said panel, and illuminating means and imaging means relative to each other; and
   imaging control means for switching imaging operations of said imaging means in accordance with the relative movement.

8. A cathode ray tube phosphor screen inspecting apparatus comprising:
   illuminating means for illuminating a panel of a cathode ray tube, in which a phosphor screen having a regular pattern is formed on an inner surface of a face, from the inner surface or an outer surface of said face;
   a plurality of imaging means for imaging light components transmitted through the same position on said phosphor screen of said panel in a plurality of directions at the same time;
   moving means for moving an imaging position relative to said phosphor screen of said panel;
   illumination control means for controlling the amount of light which is illuminated from said illumination means such that the amount of illumination at said imaging position on said panel is unchanged; and
   defect detecting means for specifying a potential defective portion detected by the simultaneous imaging in a plurality of directions as a defect on said phosphor screen;
   wherein a plurality of illuminating means are arranged in opposite directions to the imaging directions.

9. An apparatus according to claim 8, further comprising:
   storage means for storing non-defective·defective determination conditions defining non-defective·defective of a position and pattern of a defect on a phosphor screen; and non-defective-defective determining means for collating the defect specified on said phosphor screen by said defect detecting means with the non-defective-defective determination conditions stored in said storage means, thereby determining whether said phosphor screen is non-defective or defective.

10. An apparatus according to claim 8, further comprising distance adjusting means for keeping a distance between the inner surface of said face and said imaging means constant.

11. A cathode ray tube phosphor screen inspecting method comprising:

illuminating a panel of a cathode ray tube with light, in which a phosphor screen having a regular pattern is formed on an inner surface of a face of the panel, from the inner surface side of said face;

imaging a light image reflected from the inner surface of said face; and specifying a defect on said phosphor screen from data obtained by said imaging;

wherein a plurality of imaging means are juxtaposed in a direction of movement relative to said panel, and imaging operations of said imaging means are switched in accordance with the movement relative to said panel; and wherein an amount of light from said illuminating means is changed in accordance with the relative movement such that the amount of illumination at an imaging position on said panel remains unchanged.

12. A method according to claim 11, further comprising collating the specified defect on said phosphor screen with non-defective-defective determination conditions defining non-defective-defective of a position and pattern on a phosphor screen, thereby determining whether said phosphor screen is non-defective or defective.

13. A method according to claim 11, wherein an imaging distance to the inner surface of said face is kept constant.

14. A cathode ray tube phosphor screen inspecting method comprising:

illuminating a panel of a cathode ray tube, in which a phosphor screen having a regular pattern is formed on an inner surface of a face, from the inner surface or an outer surface of said face;

imaging light components transmitted through the same position on said phosphor screen of said panel in a plurality of directions at the same time;

moving an imaging position relative to said phosphor screen of said panel;

keeping the amount of illumination at said imaging position on said panel unchanged; and specifying a potential defective portion detected by the simultaneous imaging in a plurality of directions as a defect on said phosphor screen;

wherein the imaging directions are two directions along a direction in which the imaging position is moved relative to said phosphor screen of said panel, and symmetrically inclined 5 to 15° to an axis perpendicular to said phosphor screen of said panel.

15. A method according to claim 14, further comprising collating the specified defect on said phosphor screen with non-defective-defective determination conditions defining non defective-defective of a position and pattern on a phosphor screen, thereby determining whether said phosphor screen is non-defective or defective.

16. A cathode ray tube phosphor screen inspecting apparatus comprising:

illuminating means for illuminating a panel of a cathode ray tube, in which a phosphor screen having a regular pattern is formed on an inner surface of a face, from the inner surface or an outer surface of said face;

a plurality of imaging means for imaging light components transmitted through the same position on said phosphor screen of said panel in a plurality of directions at the same time;

moving means for moving an imaging position relative to said phosphor screen of said panel;

illumination control means for controlling the amount of light which is illuminated from said illumination means such that the amount of illumination at said imaging position on said panel is unchanged; and defect detecting means for specifying a potential defective portion detected by the simultaneous imaging in a plurality of directions as a defect on said phosphor screen;

wherein a pair of imaging means are juxtaposed along a direction in which the imaging position is moved relative to said phosphor screen of said panel by said moving means, and symmetrically inclined 5 to 15° to an axis perpendicular to said phosphor screen of said panel.

17. An apparatus according to claim 16, further comprising: storage means for storing non-defective-defective determination conditions defining non-defective-defective of a position and pattern of a defect on a phosphor screen; and non defective-defective determining means for collating the defect specified on said phosphor screen by said defect detecting means with the non-defective-defective determination conditions stored in said storage means, thereby determining whether said phosphor screen is non-defective or defective.

18. An apparatus according to claim 16, further comprising distance adjusting means for keeping a distance between the inner surface of said face and said imaging means constant.

19. A cathode ray tube phosphor screen inspecting apparatus comprising:

an illuminating mechanism illuminating a panel of a cathode ray tube with light, in which a phosphor screen having a regular pattern is formed on an inner surface of a face of the panel, from the inner surface side of said face;

an arrangement imaging a light image reflected from the inner surface of said face; and a defect detecting mechanism specifying a defect on said phosphor screen from imaging data obtained by said imaging mechanism;

wherein a plurality of imaging means are juxtaposed in a direction of movement relative to said panel; and moving means for moving said panel, and illuminating means and imaging means relative to each other; and imaging control means for switching imaging operations of said imaging means in accordance with the relative movement and an amount of light from said illuminating means is changed in accordance with the relative movement such that the amount of illumination at an imaging position on said panel remains unchanged.

* * * * *